United States Patent
Xi et al.

(10) Patent No.: US 9,454,047 B2
(45) Date of Patent: Sep. 27, 2016

(54) LIQUID CRYSTAL DISPLAY PANEL, METHOD OF DRIVING THE SAME AND DISPLAY DEVICE

(71) Applicants: Shanghai AVIC Optoelectronics Co., Ltd., Shanghai (CN); Tianma Micro-Electronics Co., Ltd., Shenzhen (CN)

(72) Inventors: Kerui Xi, Shanghai (CN); Tingting Cui, Shanghai (CN)

(73) Assignees: SHANGHAI AVIC OPTOELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 50 days.

(21) Appl. No.: 14/681,005

(22) Filed: Apr. 7, 2015

(65) Prior Publication Data

US 2016/0103373 A1    Apr. 14, 2016

(30) Foreign Application Priority Data

Oct. 10, 2014 (CN) .......................... 2014 1 0531492

(51) Int. Cl.
*G02F 1/1343* (2006.01)
*G02F 1/1335* (2006.01)
(Continued)

(52) U.S. Cl.
CPC ....... *G02F 1/134336* (2013.01); *G02F 1/1337* (2013.01); *G02F 1/133345* (2013.01);
(Continued)

(58) Field of Classification Search
CPC ............ G09G 3/3614; G09G 3/3696; G09G 3/3648; G09G 3/36; G09G 3/3655; G09G 3/3629; G09G 2300/0426; G09G 2300/0823; G09G 2310/0254; G09G 2310/02; G09G 2310/0243; G09G 2310/0251; G09G 2310/0256; G02F 1/1368; G02F 1/136268; G02F 1/134309; G02F 1/134336; G02F 1/13439; G02F 1/133345; G02F 1/134363; G02F 1/13306; G02F 1/133; G02F 1/13; G02F 1/1343; G02F 1/141; G02F 1/155; H01L 27/3253; H01L 27/3276; H01L 45/1253
USPC ............... 345/204, 205, 206, 79, 95, 96, 99; 349/33, 43, 37, 138, 139, 141, 143, 42, 349/187
See application file for complete search history.

(56) References Cited

U.S. PATENT DOCUMENTS

2014/0293178 A1* 10/2014 Lin ....................... G02F 1/137
349/33

FOREIGN PATENT DOCUMENTS

CN    101718920 A    6/2010
WO    2010137217 A1   12/2010

*Primary Examiner* — Thoi Duong
(74) *Attorney, Agent, or Firm* — Anova Law Group, PLLC

(57) ABSTRACT

A liquid crystal display panel includes an upper substrate and a lower substrate arranged opposite to each other, a liquid crystal layer disposed between the upper and lower substrates, a first electrode on the upper substrate facing the lower substrate side, and a second electrode and a third electrode on the lower substrate facing the upper substrate and electrically insulated from each other. The first, second and third electrodes are connected respectively to first, second and third voltages. When the first voltage is opposite in polarity to the second voltage and the second voltage is identical in polarity to the third voltage, the liquid crystal display panel is in a first display state. When the first voltage is identical in polarity to the third voltage and the second voltage is opposite in polarity to the third voltage, the liquid crystal display panel is in a second display state.

20 Claims, 20 Drawing Sheets

(51) Int. Cl.
  *G02F 1/1333* (2006.01)
  *G02F 1/1337* (2006.01)
  *G09G 3/36* (2006.01)
  *G09G 3/00* (2006.01)

(52) U.S. Cl.
  CPC .......... *G02F1/133528* (2013.01); *G09G 3/006* (2013.01); *G09G 3/3648* (2013.01); *G02F 2001/134318* (2013.01); *G09G 2300/0469* (2013.01)

LIQUID CRYSTAL DISPLAY PANEL, METHOD OF DRIVING THE SAME AND DISPLAY DEVICE

CROSS-REFERENCES TO RELATED APPLICATIONS

This application claims the benefit of priority to Chinese Patent Application No. 201410531492.7, filed with the Chinese Patent Office on Oct. 10, 2014 and entitled "A LIQUID CRYSTAL DISPLAY PANEL, A METHOD OF DRIVING THE SAME AND DISPLAY DEVICE", the content of which is incorporated herein by reference in its entirety.

BACKGROUND OF THE INVENTION

A liquid crystal display panel generally includes an array substrate, an opposing substrate and liquid crystal molecules located between the substrates. Alignment layers are arranged on both the side of the array substrate facing the liquid crystal molecules and the side of the opposing substrate facing the liquid crystal molecules, where the alignment layers orient an initial state of the liquid crystal molecules. Grooves formed as a result of friction in some direction are arranged on the sides of the alignment layers facing the liquid crystal molecules, and the liquid crystal molecules in proximity to the alignment layers are arranged oriented along the grooves in the initial state.

The alignment layers are arranged in the liquid crystal display panel to control the initial state of the liquid crystal molecules so as to display in black and white on the liquid crystal display panel, thus complicating a process of fabricating the liquid crystal display panel, and the initial state of the liquid crystal molecules have to be oriented by the alignment layers taking into account an adhesion coefficient of the liquid crystal molecules and other factors, thus degrading a response speed of the liquid crystal display panel and resulting in high power consumption.

Referring to FIG. 1a and FIG. 1b, an existing Twisted Nematic (TN)-type liquid crystal display panel includes a first substrate 101, a second substrate 102, liquid crystal molecules 103 (taking nematic liquid crystal molecules as an example) located between the two substrates, Thin Film Transistors (TFTs) (not illustrated), pixel electrodes 104 and a first alignment layer 105 on the side of the second substrate 102 facing the liquid crystal molecules 103, a common electrode 106 and a second alignment layer 107 on the side of the first substrate 101 facing the liquid crystal molecules 103, a first polarizing sheet 108 on the side of the second substrate 102 facing away from the liquid crystal molecules 103 and a second polarizing sheet 109 on the side of the first substrate 101 facing away from the liquid crystal molecules 103, where the friction direction of the first alignment layer 105 is perpendicular to the friction direction of the second alignment layer 107, and the direction of a light transmitting axis of the first polarizing sheet 108 is perpendicular to the direction of a light transmitting axis of the second polarizing sheet 109. When the TFTs are off, as illustrated in FIG. 1a, no electric field is formed between the pixel electrodes 104 and the common electrode 106, and linearly polarized light through the first polarizing sheet 108 is rotated by the liquid crystal molecules 103 by 90° into another linearly polarized light in the same polarization direction as the direction of the light transmitting axis of the second polarizing sheet 109 and can exit from a side of the second polarizing sheet 109 (as denoted by dotted lines illustrated in FIG. 1a) to thereby display in white, that is, backlight is transmitted through to display in white. When the TFTs are on and a grayscale voltage signal is applied to the pixel electrodes 104, as illustrated in FIG. 1b, an electric field is formed between the pixel electrodes 104 and the common electrode 106 so that the liquid crystal molecules 103 are arranged perpendicular to the second substrate 102, and linearly polarized light through the first polarizing sheet 108 is not rotated by the liquid crystal molecules 103, and its polarization direction is perpendicular to the direction of the light transmitting axis of the second polarizing sheet 109 so that it doesn't exit from the side of the second polarizing sheet 109 (as denoted by dotted lines illustrated in FIG. 1b) to thereby display in black, that is, the linearly polarized light is absorbed but no light ray exits to display in black.

The alignment layers have to be arranged in the liquid crystal display panel above to control the initial state of the liquid crystal molecules, thus complicating a process of fabricating the liquid crystal display panel, and the initial state of the liquid crystal molecules have to be oriented by the alignment layers taking into account the adhesion coefficient of the liquid crystal molecules and other factors, thus degrading a response speed of the liquid crystal display panel and resulting in high power consumption. Thus, a technical solution to simplify the process of fabricating the liquid crystal display panel, to improve the response speed thereof and to lower power consumption thereof is needed.

BRIEF SUMMARY OF THE INVENTION

In view of this, embodiments of the disclosure provide a liquid crystal display panel, a method of driving the same and a display device so as to simplify a process of fabricating the liquid crystal display panel, to improve the response speed thereof and to lower power consumption thereof.

According to an embodiment of the disclosure, a liquid crystal display panel includes an upper substrate and a lower substrate arranged opposite to each other, a liquid crystal layer disposed between the upper substrate and the lower substrate, a first electrode on a side of the upper substrate facing the lower substrate, and a second electrode and a third electrode on the side of the lower substrate facing the upper substrate and electrically insulated from each other. The first electrode, the second electrode and the third electrode are connected respectively to a first voltage, a second voltage and a third voltage. When the first voltage is opposite in polarity to the second voltage and the second voltage is identical in polarity to the third voltage, the liquid crystal display panel is in a first display state. When the first voltage is identical in polarity to the third voltage and the second voltage is opposite in polarity to the third voltage, the liquid crystal display panel is in a second display state.

An embodiment of the disclosure further provides a display device including the liquid crystal display panel described above according to the embodiment of the disclosure.

An embodiment of the disclosure further provides a method of driving the above-described liquid crystal display panel, the method including:

connecting the first electrode, the second electrode and the third electrode respectively to the first voltage, the second voltage and the third voltage, determining whether the first voltage is opposite in polarity to the second voltage and the second voltage is identical in polarity to the third voltage; in the event that the first voltage is opposite in polarity to the second voltage and the second voltage is identical in polarity to the third voltage:

determining that the liquid crystal display panel is in the first display state; and determining whether the first voltage is identical in polarity to the third voltage and the second voltage is opposite in polarity to the third voltage; in the event that the first voltage is identical in polarity to the third voltage and the second voltage is opposite in polarity to the third voltage:

determining that the liquid crystal display panel is in the second display state.

With the liquid crystal display panel, the method of driving the same and the display device according to the embodiments of the disclosure, the liquid crystal display panel includes an upper substrate and a lower substrate, both of which are arranged in opposition, a liquid crystal layer between the two substrates, a first electrode on the side of the upper substrate facing the lower substrate, and a second electrode and a third electrode, on the side of the lower substrate facing the upper substrate, electrically insulated from each other, where the first electrode, the second electrode and the third electrode are connected respectively to a first voltage, a second voltage and a third voltage so that when the first voltage is opposite in polarity to the second voltage and the second voltage is identical in polarity to the third voltage, the liquid crystal display panel is in a first display state; and when the first voltage is identical in polarity to the third voltage and the second voltage is opposite in polarity to the third voltage, the liquid crystal display panel is in a second display state; and the arrangement state of liquid crystal molecules is controlled by changing electric fields between the two substrates without arranging any alignment layer so that a process of fabricating the liquid crystal display panel may be simplified and liquid crystal molecules with a low drive voltage and a high response speed may be selected to thereby lower power consumption thereof and improve a response speed thereof.

DETAILED DESCRIPTION OF THE INVENTION

Figure 1A:
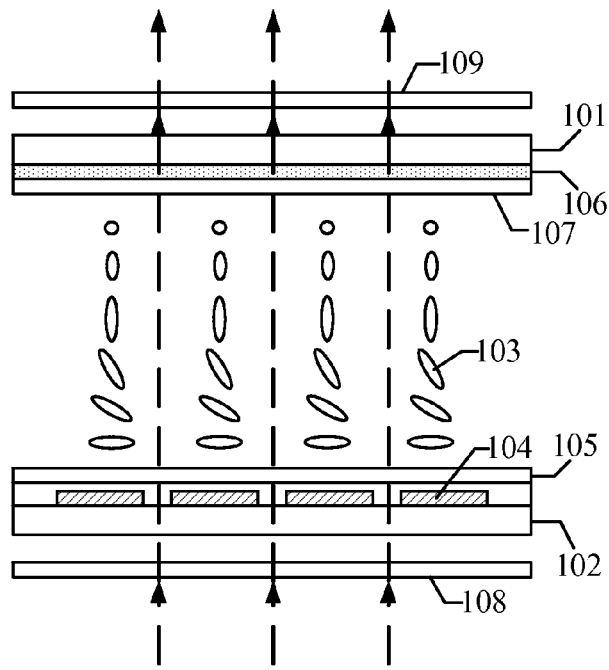
FIG. 1a and FIG. 1b are schematic structural diagrams of a liquid crystal display panel in the TN display mode displaying in white and in black respectively.
Figure 1B:
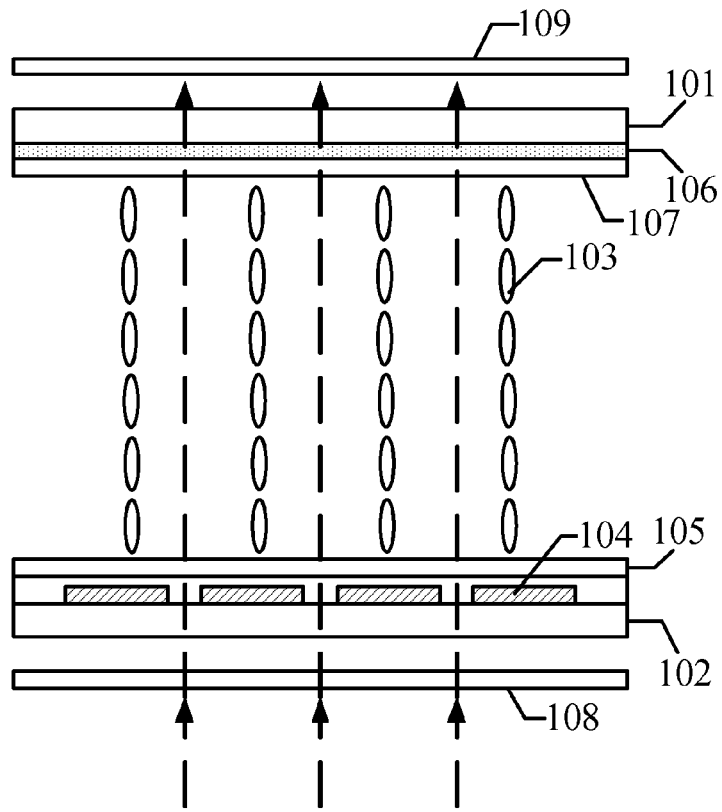

A liquid crystal display panel, a method of driving the same and a display device according to embodiments of the present disclosure will be described below in details.

The shapes and the thicknesses of respective film layers in the drawings are not intended to reflect their actual proportions but merely illustrate the present disclosure.

Embodiments of the present invention provide a liquid crystal display panel. Referring to FIG. 2 to FIG. 5, the liquid crystal display panel includes an upper substrate 1 and a lower substrate 2 arranged opposite to each other, a liquid crystal layer 3 disposed between the upper substrate 1 and the lower substrate 2, a first electrode 4 on the side of the upper substrate 1 facing the lower substrate 2, and a second electrode 5 and a third electrode 6 on the side of the lower substrate 2 facing the upper substrate and electrically insulated from each other.

The first electrode 4, the second electrode 5 and the third electrode 6 are connected respectively to a first voltage, a second voltage and a third voltage.

When the first voltage is opposite in polarity to the second voltage and the second voltage is identical in polarity to the third voltage, the liquid crystal display panel is in a first display state.

When the first voltage is identical in polarity to the third voltage and the second voltage is opposite in polarity to the third voltage, the liquid crystal display panel is in a second display state.

In the above-described liquid crystal display panel according to the embodiment of the disclosure, the arrangement state of liquid crystal molecules is controlled by changing electric fields between the two substrates without arranging any alignment layer so that a process of fabricating the liquid crystal display panel can be simplified and liquid crystal molecules with a low drive voltage and a high response speed can be selected to thereby reduce power consumption thereof and improve a response speed thereof.

Figure 3:
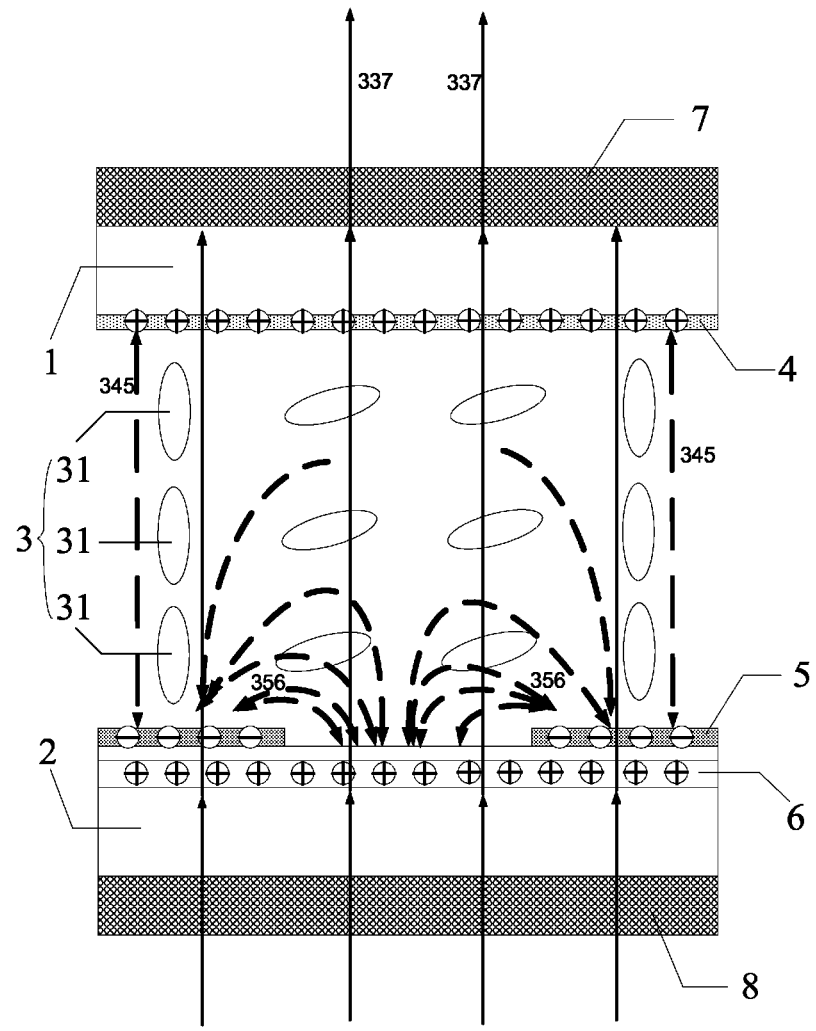
FIG. 3 is a schematic structural diagram of a liquid crystal display panel displaying in white according to an embodiment of the present disclosure where liquid crystal molecules are positive liquid crystal molecules.

It shall be noted that in the liquid crystal display panel described above according to the embodiment of the disclosure, when the first electrode 4, the second electrode 5 and the third electrode 6 are not connected to any voltage, since there is no alignment layer arranged on the side of the upper substrate 1 facing the lower substrate 2 and the side of the lower substrate 2 facing the upper substrate 1, so the initial state of the liquid crystal molecules in the liquid crystal layer 3 is out of order as illustrated in FIG. 3.

Figure 2:
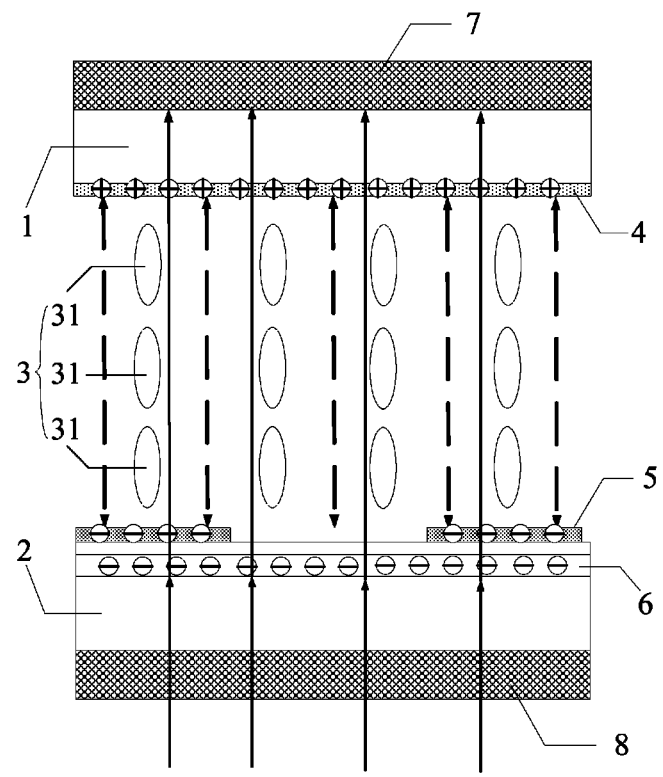
FIG. 2 is a schematic structural diagram of a liquid crystal display panel displaying in black according to an embodiment of the present disclosure where liquid crystal molecules are positive liquid crystal molecules.
Figure 4:
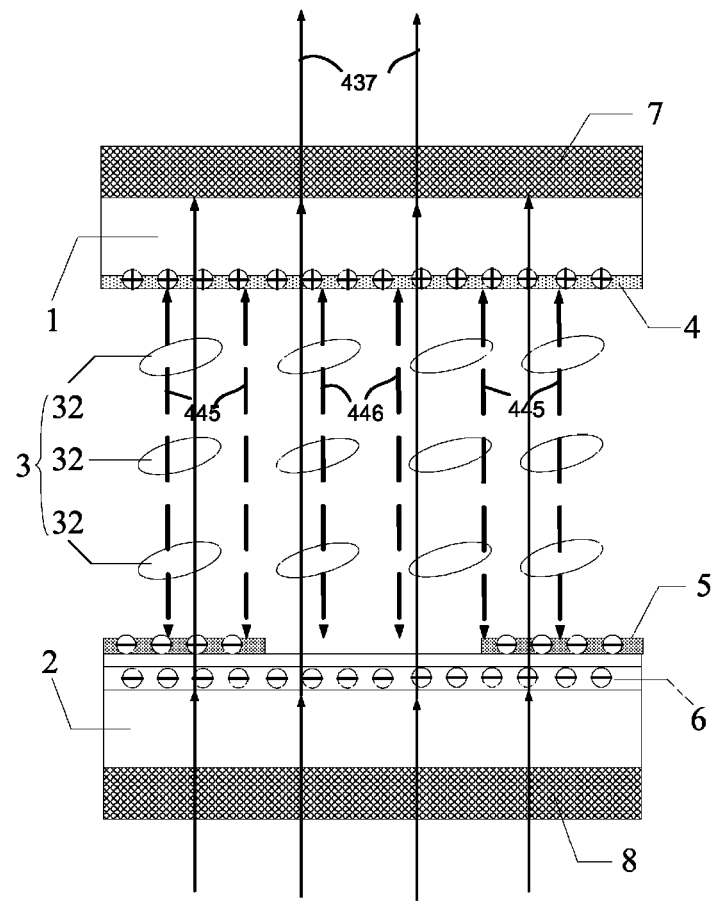
FIG. 4 is a schematic structural diagram of a liquid crystal display panel displaying in white according to an embodiment of the present disclosure where liquid crystal molecules are negative liquid crystal molecules.

In a particular implementation, in the liquid crystal display panel above according to the embodiment of the disclosure, as illustrated in FIG. 2 and FIG. 4, when the liquid crystal display panel is in the first display state, the first voltage is opposite in polarity to the second voltage (the first voltage is positive and the second voltage is negative in FIG. 2 and FIG. 4 as an example); and the second voltage is identical in polarity to the third voltage (both the second voltage and the third voltage are negative in FIG. 2 and FIG. 4 as an example), and the second voltage is equal in magnitude to the third voltage; and as such, there is no horizontal electric field between the second electrode 5 and the third electrode 6 but there are only vertical electric fields formed between the first electrode 4 and the second electrode 5 and between the first electrode 4 and the third electrode 6.

Of course, when the liquid crystal display panel is in the first display state, the first voltage is opposite in polarity to the second voltage, and the absolute value of the first voltage may be equal in magnitude to the absolute value of the second voltage, or the absolute value of the first voltage may not be equal in magnitude to the absolute value of the second voltage, but the disclosure will not be limited in this regard; and the second voltage is identical in polarity to the third voltage, and the second voltage may not be equal in magnitude to the third voltage; that is, there may be a horizontal electric field formed between the second electrode and the third electrode in addition to the vertical electric fields formed between the first electrode and the second electrode and between the first electrode and the third electrode, but the disclosure will not be limited in this regard.

Figure 5:
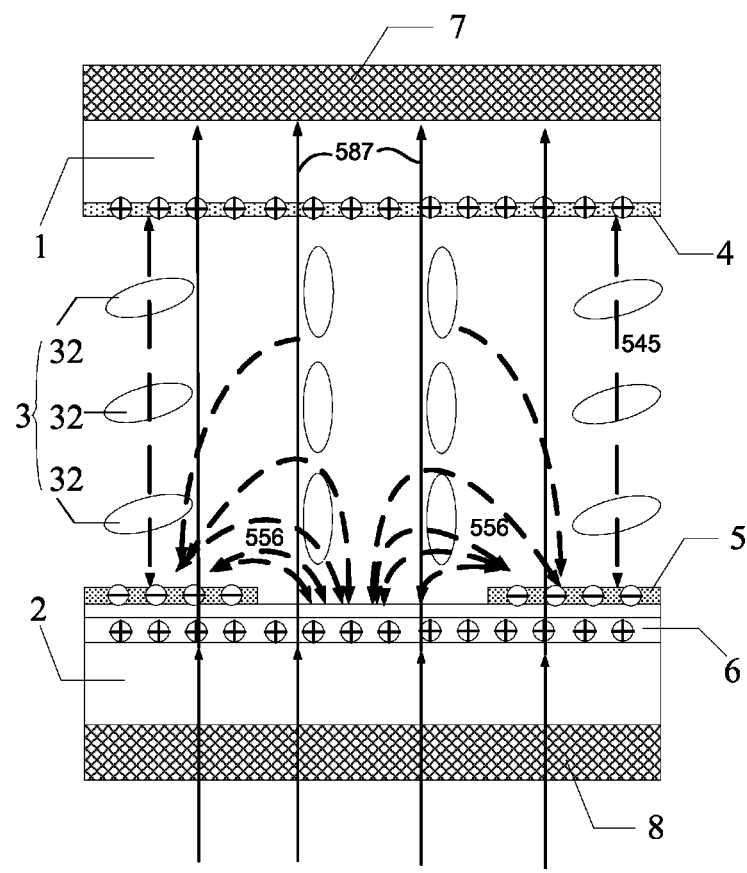
FIG. 5 is a schematic structural diagram of a liquid crystal display panel displaying in black according to an embodiment of the present disclosure where liquid crystal molecules are negative liquid crystal molecules.
Figure 6:
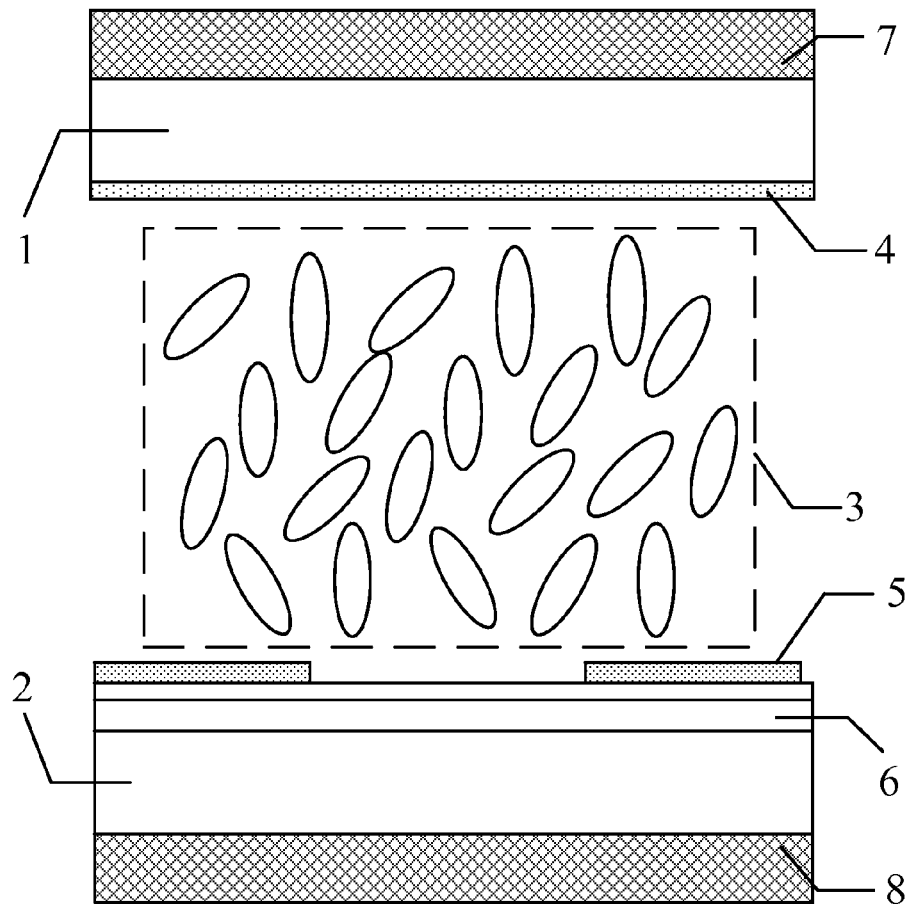
FIG. 6 is a schematic structural diagram of a liquid crystal display panel which is powered off according to an embodiment of the present disclosure.

In a particular implementation, in the liquid crystal display panel above according to the embodiment of the disclosure, as illustrated in FIG. 3 and FIG. 5, when the liquid crystal display panel is in the second display state, the first voltage is identical in polarity to the third voltage (both the first voltage and the third voltage are positive in FIG. 3 and FIG. 5 as an example), and the first voltage is equal in magnitude to the third voltage; and the second voltage is opposite in polarity to the third voltage (the second voltage is negative and the third voltage are positive in FIG. 3 and FIG. 5 as an example); and as such, there is no vertical electric field between the first electrode 4 and the third electrode 6 but there are a horizontal electric field formed between the second electrode 5 and the third electrode 6 and a vertical electric field formed between the first electrode 4 and the second electrode 5.

Of course, when the liquid crystal display panel is in the second display state, the second voltage is opposite in polarity to the third voltage, and the absolute value of the second voltage may be equal in magnitude to the absolute value of the third voltage, or the absolute value of the second voltage may not be equal in magnitude to the absolute value of the third voltage, but the disclosure will not be limited in this regard; and the first voltage is identical in polarity to the third voltage, and the first voltage may not be equal in magnitude to the third voltage; that is, there may be a vertical electric field formed between the first electrode and the third electrode in addition to the vertical electric field formed between the first electrode and the second electrode and the horizontal electric field formed between the second electrode and the third electrode, but the disclosure will not be limited in this regard.

In a particular implementation, the liquid crystal display panel above according to the embodiment of the disclosure as illustrated in FIG. 2 and FIG. 3 can further include a first polarizing sheet 7 on the side of the upper substrate 1 away from the lower substrate 2 and a second polarizing sheet 8 on the side of the lower substrate 2 away from the upper substrate 1, where the direction of a light transmitting axis of the first polarizing sheet 7 is perpendicular to the direction of a light transmitting axis of the second polarizing sheet 8, and the liquid crystal layer includes positive liquid crystal molecules 31; and as illustrated in FIG. 2, the first display state is in black, and as illustrated in FIG. 3, the second display state is in white state.

Particularly as illustrated in FIG. 2, the liquid crystal molecules in the liquid crystal layer are positive liquid crystal molecules 31, where $\Delta \in > 0$, that is, the liquid crystal molecules 31 in the liquid crystal layer need to be provided with positive dielectric constant anisotropy. The first voltage is opposite in polarity to the second voltage, the second voltage is identical in polarity to the third voltage and the second voltage is equal in magnitude to the third voltage, there are vertical electric fields formed between the first electrode 4 and the second electrode 5, and between the first electrode 4 and the third electrode 6 (as illustrated by dotted lines illustrated in FIG. 2), and all the positive liquid crystal molecules 31 are arranged in the direction perpendicular to the upper substrate 1 and the lower substrate 2 due to the vertical electric fields, and at this time, the positive liquid crystal molecules 31 are aligned oriented perpendicular to the upper substrate 1 and the lower substrate 2, and light emitted from a backlight source (not illustrated) is polarized by the second polarizing sheet 8 into linearly polarized light in the same polarization direction as the direction of the light transmitting axis of the second polarizing sheet 8, where the polarization direction of the linearly polarized light is horizontal to the direction of a short axis of the positive liquid crystal molecules 31 and cannot be rotated by the positive liquid crystal molecules 31 and is incident to the first polarizing sheet 7 as it is, where the polarization direction of the linearly polarized light is perpendicular to the direction of the light transmitting axis of the first polarizing sheet 7, and the linearly polarized light is absorbed by the first polarizing sheet 7 but could not exit from the side of the first polarizing sheet 7 (as denoted by solid lines illustrated in FIG. 2), and the liquid crystal display panel displays fully in black state, that is, the first display state is in black, and this display mode in black is similar to display in black in the Vertical Alignment (VA) mode, and the contrast of the liquid crystal display panel is high. Since the liquid crystal display panel displays fully in black, the arrangement of a light shielding layer on the side of the upper substrate 1 could be further dispensed with so that the process of fabricating the liquid crystal display panel could be simplified but also the aperture ratio of the display panel could be improved effectively, which is particularly suitable for a liquid crystal display panel with high definition.

Of course, the first voltage is opposite in polarity to the second voltage, and the absolute value of the first voltage may be equal in magnitude to the absolute value of the second voltage, or the absolute value of the first voltage may not be equal in magnitude to the absolute value of the second voltage, but the disclosure will not be limited in this regard; and the second voltage is identical in polarity to the third voltage, and the second voltage may not be equal in magnitude to the third voltage so that there may be also a horizontal electric field between the second electrode and the third electrode, where the horizontal electric field overlaps with the vertical electric field between the first electrode and the third electrode in an area where the angle between the direction of the short axis of the liquid crystal molecules and the upper and lower substrates is larger than zero and smaller than 90°, and at this time, the light emitted from the backlight source is polarized by the second polarizing sheet into linearly polarized light in the same polarization direction as the direction of the transmitting axis of the second polarizing sheet. Since the polarization direction of the linearly polarized light may not be horizontal to the direction of the short axis of the liquid crystal molecules in the overlapping area, the linearly polarized light may be subject to the effect of birefringence through the liquid crystal molecules in the area so that the polarization direction of the linearly polarized light has a component in the direction of the transmitting axis of the first polarizing sheet, and a part of the linearly polarized light exits the side of the first polarizing sheet, thus possibly resulting in light leakage in the area where the horizontal electric field between the second electrode and the third electrode overlaps with the vertical electric field between the first electrode and the third electrode so that the liquid crystal display panel may not display "fully in black" in the area, thus degrading the contrast of the liquid crystal display panel.

Particularly as illustrated in FIG. 3, the liquid crystal molecules in the liquid crystal layer are positive liquid crystal molecules 31, where $\Delta \in > 0$, that is, the liquid crystal molecules in the liquid crystal layer 3 need to be provided with positive dielectric constant anisotropy. The first voltage is identical in polarity to the third voltage and the first voltage is equal in magnitude to the third voltage, the second voltage is opposite in polarity to the third voltage, there is a horizontal electric field formed between the second electrode 5 and the third electrode 6 (as denoted by dotted lines 356 illustrated in FIG. 3), and the positive liquid crystal molecules 31 in the area of the horizontal electric field are inclined "lying down" in the direction of the horizontal electric field due to the electric field, and at this time, light emitted from a backlight source (not illustrated) is polarized by the second polarizing sheet 8 into linearly polarized light in the same polarization direction as the direction of the transmitting axis of the second polarizing sheet 8, where the linearly polarized light is converted by the positive liquid crystal molecules 31 in the area into circularly (elliptically) polarized light which can exit from the side of the first polarizing sheet 7 (as denoted by solid lines 337 illustrated in FIG. 3), that is, the light is transmitted in the area of the horizontal electric field, and the liquid crystal display panel displays in white, that is, the second display state is in white, and this display mode in white is similarly to display in white in the In-Plane Switched (IPS) mode; and there is a vertical electric field formed between the first electrode 4 and the second electrode 5 (as denoted by dotted lines 345 illustrated in FIG. 3), and the positive liquid crystal molecules 31 in the area of the vertical electric field are arranged in the direction perpendicular to the upper substrate 1 and the lower substrate 2 due to the vertical electric field, and at this time, light emitted from a backlight source (not illustrated) is polarized by the second polarizing sheet 8 into linearly polarized light in the same polarization direction as the direction of the transmitting axis of the second polarizing sheet 8, where the polarization direction of the linearly polarized light is horizontal to the direction of the short axis of the positive liquid crystal molecules 31 in the area of the perpendicular electric field and will not be subject to the effect of birefringence through the positive liquid crystal molecules 31 in the area, the polarization direction of the linearly polarized light is perpendicular to the direction of the transmitting axis of the first polarizing sheet 7, and the linearly polarized light is absorbed by the first polarizing sheet 7 but cannot exit the side of the first polarizing sheet 7 (as denoted by solid lines illustrated in FIG. 3), that is, no light is transmitted in the area of the perpendicular electric field, so signal transmission lines in the liquid crystal display panel to be shielded by a light shielding layer, typically metal transmission lines, e.g., source/drain transmission lines 10, etc., could be arranged in the area of the perpendicular electric field, that is, the signal transmission lines in the liquid crystal display panel to be shielded by the light shielding layer, i.e., metal transmission lines (not illustrated), etc., could be arranged in the area of the second electrode 5, and as such, the arrangement of the light shielding layer could be dispensed with so that the process of fabricating the liquid crystal display panel could be simplified but also the aperture ratio of the display panel could be improved effectively, which is particularly suitable for a liquid crystal display panel at high definition.

Of course, the second voltage is opposite in polarity to the third voltage, and the absolute value of the second voltage may be equal in magnitude to the absolute value of the third voltage, or the absolute value of the second voltage may not be equal in magnitude to the absolute value of the third voltage, but the disclosure will not be limited in this regard; and the first voltage is identical in polarity to the third voltage, and the first voltage may not be equal in magnitude to the third voltage so that there may be also a vertical electric field between the first electrode and the third electrode, where the vertical electric field overlaps with the horizontal electric field between the second electrode and the third electrode in an area where the angle between the direction of the short axis of the liquid crystal molecules and the upper and lower substrates may be larger than zero and smaller than 90°, and at this time, the light emitted from the backlight source is polarized by the second polarizing sheet into linearly polarized light in the same polarization direction as the direction of the transmitting axis of the second polarizing sheet. Since the polarization direction of the linearly polarized light may not be horizontal to the direction of the short axis of the liquid crystal molecules in the overlapping area, the linearly polarized light may be subject to the effect of birefringence through the liquid crystal molecules in the area so that the polarization direction of the linearly polarized light has a component in the direction of the transmitting axis of the first polarizing sheet, and a part of the linearly polarized light exits from the side of the first polarizing sheet, thus possibly degrading the brightness in the area where the horizontal electric field between the second electrode and the third electrode overlaps with the vertical electric field between the first electrode and the third electrode, thus degrading the contrast of the liquid crystal display panel.

In a particular implementation, the liquid crystal display panel above according to the embodiment of the disclosure as illustrated in FIG. 4 and FIG. 5 can further include a first polarizing sheet 7 on the side of the upper substrate 1 away from the lower substrate 2 and a second polarizing sheet 8 on the side of the lower substrate 2 away from the upper substrate 1, where the direction of a light transmitting axis of the first polarizing sheet 7 is perpendicular to the direction of a light transmitting axis of the second polarizing sheet 8, and the liquid crystal layer 3 includes negative liquid crystal molecules 32; and as illustrated in FIG. 4, the first display state is in white, and as illustrated in FIG. 5, the second display state is in black.

Particularly as illustrated in FIG. 4, the liquid crystal molecules in the liquid crystal layer 3 are negative liquid crystal molecules 32, where Δ∈<0, that is, the liquid crystal molecules in the liquid crystal layer 3 need to be provided with negative dielectric constant anisotropy. The first voltage is opposite in polarity to the second voltage, the second voltage is identical in polarity to the third voltage and the second voltage is equal in magnitude to the third voltage, there are vertical electric fields formed between the first electrode 4 and the second electrode 5 (as illustrated by dotted lines 445 illustrated in FIG. 4) and between the first electrode 4 and the third electrode 6 (as illustrated by dotted lines 446 illustrated in FIG. 4), and all the negative liquid crystal molecules 32 are inclined "lying down" in the direction of the vertical electric fields due to the electric fields, and at this time, light emitted from a backlight source (not illustrated) is polarized by the second polarizing sheet 8 into linearly polarized light in the same polarization direction as the direction of the light transmitting axis of the second polarizing sheet 8, where the linearly polarized light is converted by the negative liquid crystal molecules 32 in the area into circularly (elliptically) polarized light which can exit from the side of the first polarizing sheet 7 (as denoted by solid lines 437 illustrated in FIG. 4), and the liquid crystal display panel displays fully in white, that is, the first display state is in white. At this time, a light shielding layer (not illustrated) needs to be arranged on the side of the upper substrate 1 to shield signal transmission lines, typically metal transmission lines (not illustrated), etc.

Of course, the first voltage is opposite in polarity to the second voltage, and the absolute value of the first voltage may be equal in magnitude to the absolute value of the second voltage, or the absolute value of the first voltage may not be equal in magnitude to the absolute value of the second voltage, but the disclosure will not be limited in this regard; and the second voltage is identical in polarity to the third voltage, and the second voltage may not be equal in magnitude to the third voltage so that there may be also a horizontal electric field between the second electrode and the third electrode, where the horizontal electric field overlaps with the vertical electric field between the first electrode and the third electrode in an area where the angle between the direction of the short axis of the liquid crystal molecules and the upper and lower substrates may be larger than zero and smaller than 90°, and at this time, the light emitted from the backlight source is polarized by the second polarizing sheet into linearly polarized light in the same polarization direction as the direction of the light transmitting axis of the second polarizing sheet. Since the polarization direction of the linearly polarized light may not be horizontal to the direction of the short axis of the liquid crystal molecules in the overlapping area, the linearly polarized light may be subject to the effect of birefringence through the liquid crystal molecules in the area so that the polarization direction of the linearly polarized light has a component in the direction of the transmitting axis of the first polarizing sheet, and a part of the linearly polarized light exits the side of the first polarizing sheet, thus possibly degrading brightness in the area where the horizontal electric field between the second electrode and the third electrode overlaps with the vertical electric field between the first electrode and the third electrode, thus degrading the contrast of the liquid crystal display panel.

Particularly as illustrated in FIG. 5, the liquid crystal molecules in the liquid crystal layer 3 are negative liquid crystal molecules 32, where Δ∈<0, that is, the liquid crystal molecules in the liquid crystal layer 3 need to be provided with negative dielectric constant anisotropy. The first voltage is identical in polarity to the third voltage and the first voltage is equal in magnitude to the third voltage, the second voltage is opposite in polarity to the third voltage, there is a horizontal electric field formed between the second electrode 5 and the third electrode 6 (as denoted by dotted lines 556 illustrated in FIG. 5), and the negative liquid crystal molecules 32 in the area of the horizontal electric field are arranged in the direction perpendicular to the upper substrate 1 and the lower substrate 2 due to the horizontal electric field, and at this time, the negative liquid crystal molecules 32 are aligned oriented perpendicular to the upper substrate 1 and the lower substrate 2, and light emitted from a backlight source (not illustrated) is polarized by the second polarizing sheet 8 into linearly polarized light in the same polarization direction as the direction of the light transmitting axis of the second polarizing sheet 8, where the polarization direction of the linearly polarized light is parallel to the direction of a short axis of the negative liquid crystal molecules 32 and could not be rotated by the negative liquid crystal molecules 32 but is incident to the first polarizing sheet 7 as it is, where the polarization direction of the linearly polarized light is perpendicular to the direction of the transmitting axis of the first polarizing sheet 7, and the linearly polarized light is absorbed by the first polarizing sheet 7 but could not exit from the side of the first polarizing sheet 7 (as denoted by solid lines 587 illustrated in FIG. 5), and the liquid crystal display panel displays in black, that is, the second display state is in black; and there is a vertical electric field formed between the first electrode 4 and the second electrode 5 (as denoted by dotted lines 545 illustrated in FIG. 5), and the negative liquid crystal molecules 32 in the area of the vertical electric field are inclined "lying down" in the direction of the vertical electric field due to the electric field, and at this time, light emitted from a backlight source (not illustrated) is polarized by the second polarizing sheet 8 into linearly polarized light in the same polarization direction as the direction of the light transmitting axis of the second polarizing sheet 8, where the linearly polarized light is converted by the negative liquid crystal molecules 32 in the area into circularly (elliptically) polarized light which could exit from the side of the first polarizing sheet 7 (as denoted by solid lines illustrated in FIG. 5), that is, light is leaked in the area of the vertical electric field, so when signal transmission lines are arranged in the area of the vertical electric field, i.e., the area of the second electrode 5, a light shielding layer (not illustrated) needs to be arranged in the area of the vertical electric field, i.e., the area of the second electrode 5, to shield signal transmission lines, typically metal transmission lines (not illustrated), etc.

Of course, the second voltage is opposite in polarity to the third voltage, and the absolute value of the second voltage may be equal in magnitude to the absolute value of the third voltage, or the absolute value of the second voltage may not be equal in magnitude to the absolute value of the third voltage, but the disclosure will not be limited in this regard; and the first voltage is identical in polarity to the third voltage, and the first voltage may not be equal in magnitude to the third voltage so that there may be also a vertical electric field between the first electrode and the third electrode, where the vertical electric field overlaps with the horizontal electric field between the second electrode and the third electrode in an area where the angle between the direction of the short axis of the liquid crystal molecules and the upper and lower substrates may be larger than zero and smaller than 90°, and at this time, the light emitted from the backlight source is polarized by the second polarizing sheet into linearly polarized light in the same polarization direction as the direction of the light transmitting axis of the second polarizing sheet. Since the polarization direction of the linearly polarized light may not be horizontal to the direction of the short axis of the liquid crystal molecules in the overlapping area, the linearly polarized light may be subject to the effect of birefringence through the liquid crystal molecules so that the polarization direction of the linearly polarized light has a component in the direction of the transmitting axis of the first polarizing sheet, and a part of the linearly polarized light exits the side of the first polarizing sheet, thus possibly resulting in light leakage in the area where the horizontal electric field between the second electrode and the third electrode overlaps with the vertical electric field between the first electrode and the third electrode, thus degrading the contrast of the liquid crystal display panel.

Figure 7:
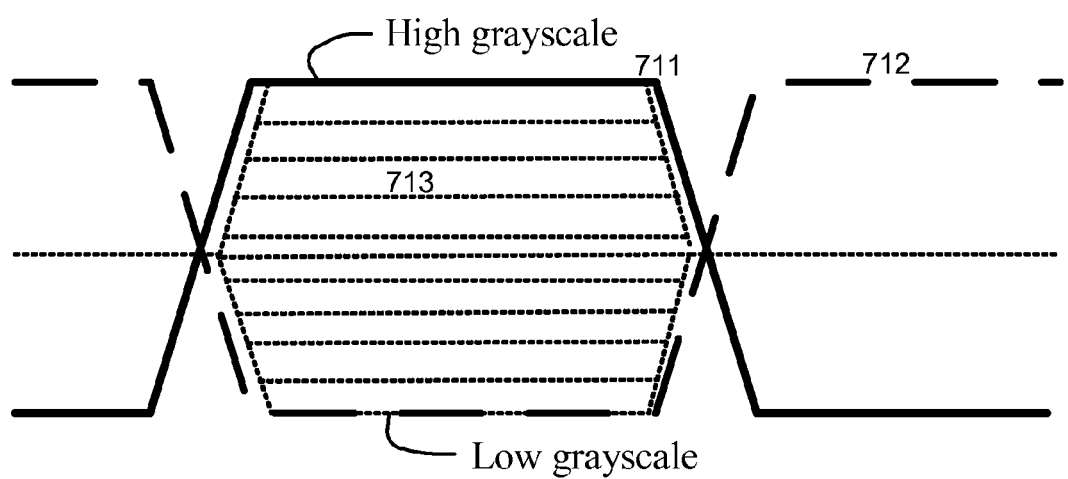
FIG. 7 is a schematic diagram of voltages at which a first electrode, a second electrode and a third electrode respectively are connected in a liquid crystal display panel according to an embodiment of the present disclosure.

In a particular implementation, in the liquid crystal display panel described above according to the embodiment of the disclosure, the relationship in magnitude among the first voltage, the second voltage and the third voltage is adjusted so that the liquid crystal display panel can display a display picture at a varying grayscale. As illustrated in FIG. 7, by way of an example where the liquid crystal molecules are positive liquid crystal molecules, when the first voltage (denoted by a solid line 711 illustrated in FIG. 7) and the second voltage (denoted by a long dotted line 712 illustrated in FIG. 7) are opposite in polarity and equal in magnitude of their absolute values, and the second voltage and the third voltage (denoted by a short dotted lines 713 illustrated in FIG. 7) are identical in polarity and equal in magnitude, the liquid crystal display panel displaying in black displays a display picture with the zero (low) grayscale; and when the first voltage and the third voltage are identical in polarity and equal in magnitude, and the second voltage and the third voltage are opposite in polarity and equal in magnitude of their absolute values, the liquid crystal display panel displaying in white displays a display picture with a high grayscale. It is noted that the driving mechanisms of the first and third electrodes with respective first and third voltages are known in the art. In the case that the second voltage 712 and the third voltage 713 are substantially equal in magnitude and opposite in polarity, the second voltage 712 can be generated from the third voltage 713, e.g., using an inverter. In other cases the second voltage can be generated either from the first voltage or the third voltage using an operational amplifier having a controllable gain.

In a particular implementation, in the liquid crystal display panel described above according to the embodiment of the disclosure, the first electrode could particularly be a first common electrode, the second electrode could particularly be a second common electrode, and the third electrode could particularly include a plurality of pixel electrodes arranged in a matrix (an array).

Figure 8:
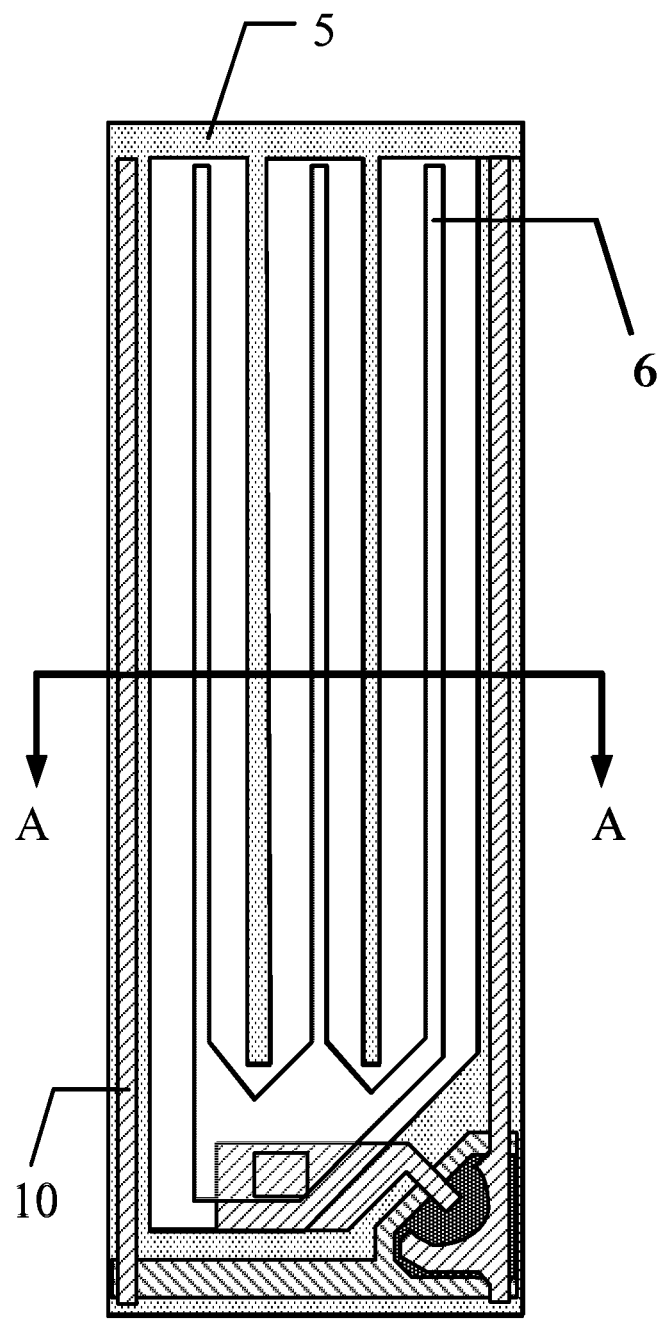
FIG. 8 is a schematic structural diagram of the side of a liquid crystal display panel on a lower substrate according to an embodiment of the present disclosure.
Figure 9:
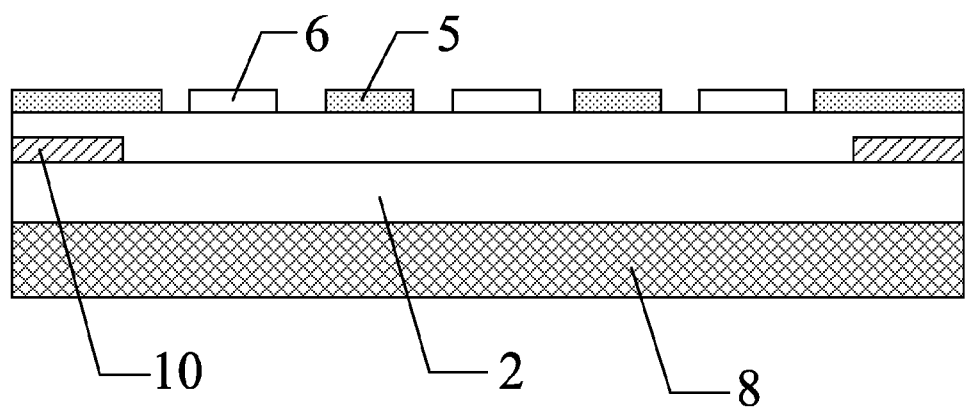
FIG. 9 is another schematic structural diagram of the side of a liquid crystal display panel on a lower substrate according to an embodiment of the present disclosure.

In a particular implementation, in the liquid crystal display panel described above according to the embodiment of the disclosure, as illustrated in FIG. 8 and FIG. 9, the second common electrode, i.e., the second electrode 5, and the pixel electrode, i.e., the third electrode 6, can be arranged at (in) the same layer; or as illustrated in FIG. 10 to FIG. 15, the second common electrode, i.e., the second electrode 5, and the pixel electrode, i.e., the third electrode 6, can be arranged at (in) different layers, but the disclosure will not be limited in this regard.

Particularly in the liquid crystal display panel above according to the embodiment of the disclosure, as illustrated in FIG. 8 and FIG. 9, where FIG. 9 is a sectional view of FIG. 8 along the AA direction, the second common electrode, i.e., the second electrode 5, and the pixel electrode, i.e., the third electrode 6, are arranged at (in) the same layer and electrically insulated from each other, and both the second common electrode, i.e., the second electrode 5, and the pixel electrode, i.e., the third electrode 6, are structured in a grid.

Figure 10:
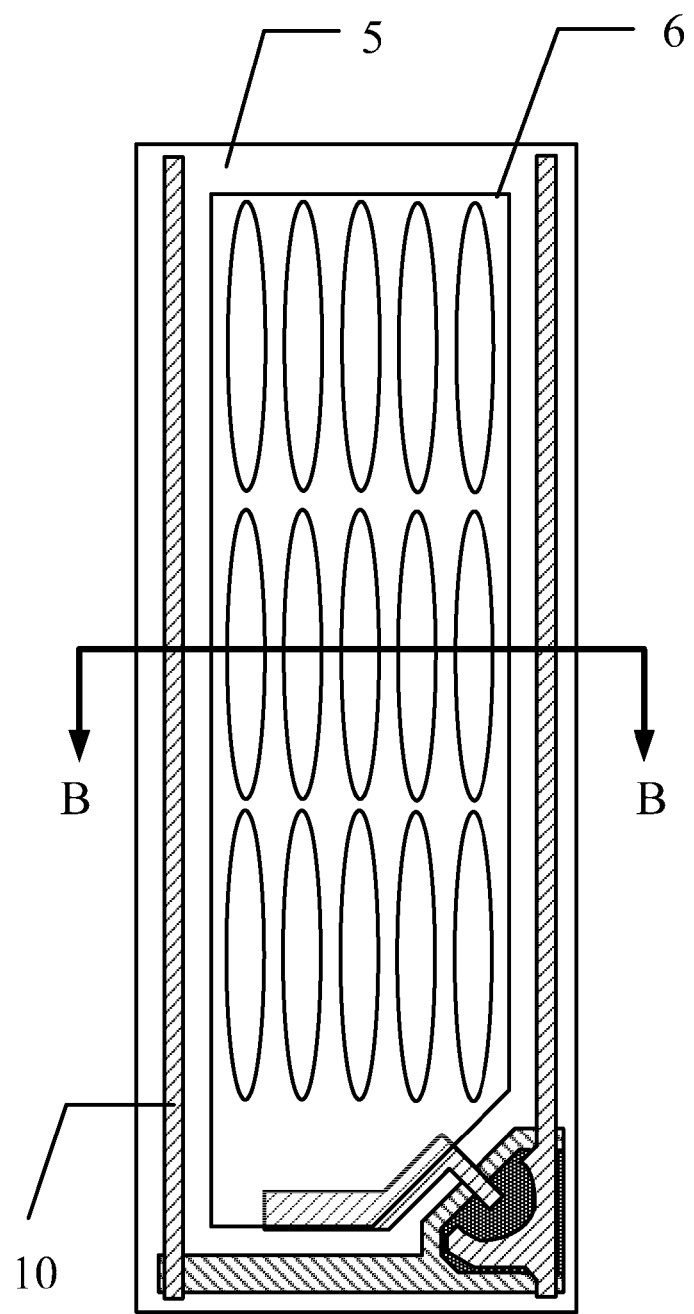
FIG. 10 is a further schematic structural diagram of the side of a liquid crystal display panel on a lower substrate according to an embodiment of the present disclosure.
Figure 11:
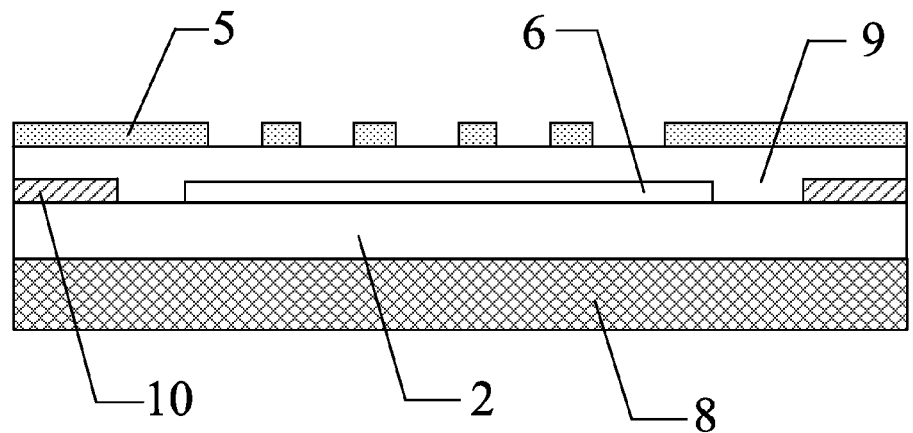
FIG. 11 is a further schematic structural diagram of the side of a liquid crystal display panel on a lower substrate according to an embodiment of the present disclosure.
Figure 12:
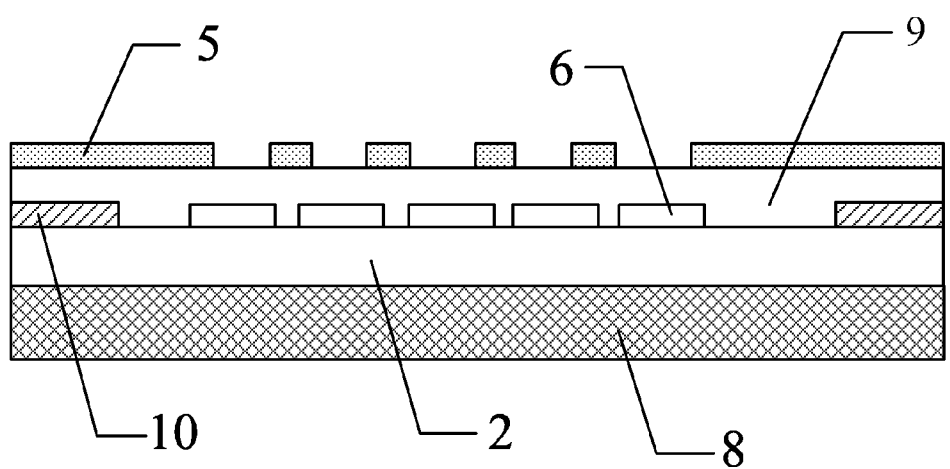
FIG. 12 is a further schematic structural diagram of the side of a liquid crystal display panel on a lower substrate according to an embodiment of the present disclosure.

Particularly in the liquid crystal display panel above according to the embodiment of the disclosure, when the second common electrode and the pixel electrodes are arranged at (in) different layers, as illustrated in FIG. 10 to FIG. 15, an insulation layer 9 between the second common electrode, i.e., the second electrode 5, and the pixel electrode, i.e., the third electrode 6, can be further included on the side of the lower substrate facing the upper substrate; and as illustrated in FIG. 10 to FIG. 12, where FIG. 11 is a sectional view of FIG. 10 along the BB direction, the second common electrode, i.e., the second electrode 5, is located above the insulation layer 9, and the pixel electrode, i.e., the third electrode 6, is located below the insulation layer 9, and since the second common electrode is located above the pixel electrode, the second common electrode needs to be arranged in a grid structure in order to ensure the horizontal electric field to be formed between the second common electrode and the pixel electrodes to control the liquid crystal molecules to be inverted; and as illustrated in FIG. 11, the pixel electrode, i.e., the third electrode 6, can be structured planar, or as illustrated in FIG. 12, the pixel electrode, i.e., the third electrode 6, can alternatively be structured in a grid, but the disclosure will not be limited in this regard.

Figure 13:
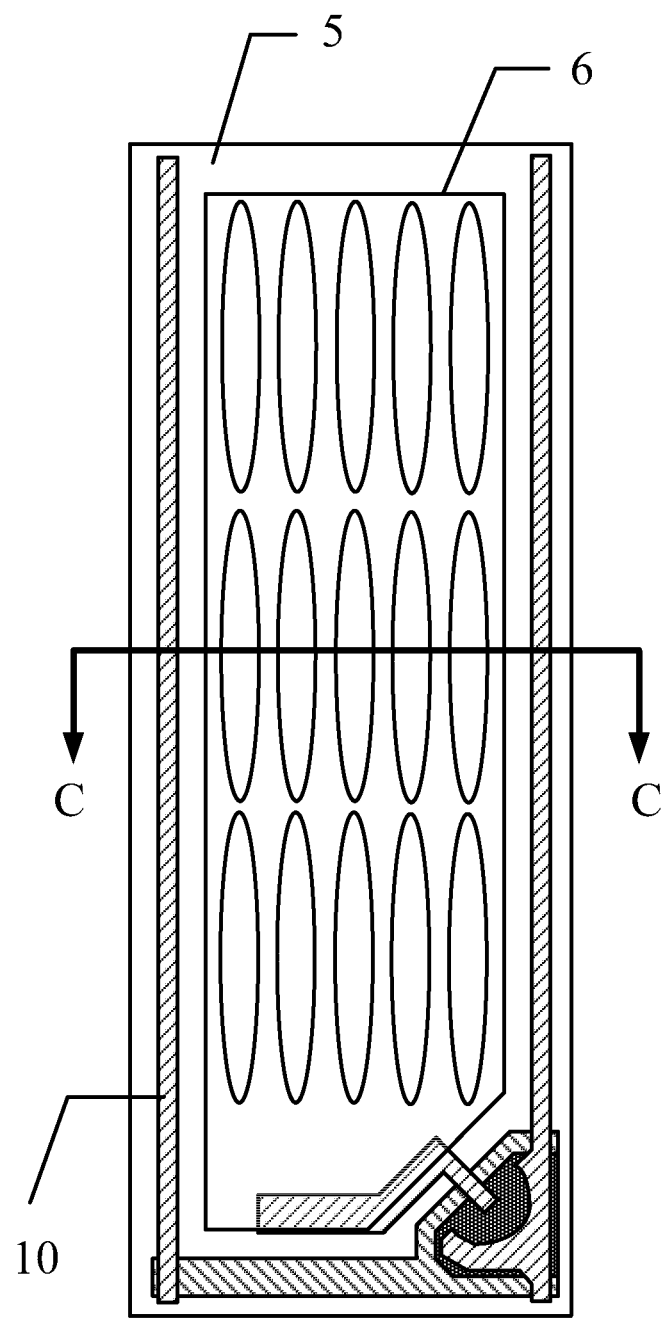
FIG. 13 is a further schematic structural diagram of the side of a liquid crystal display panel on a lower substrate according to an embodiment of the present disclosure.
Figure 14:
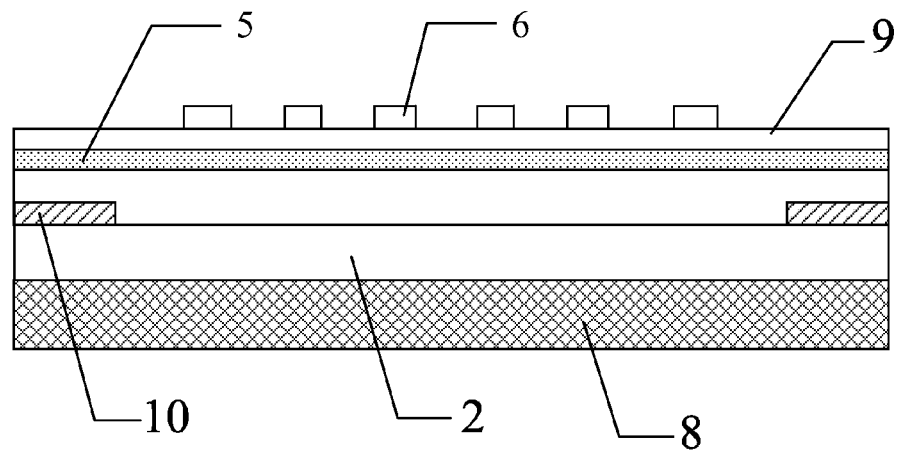
FIG. 14 is a further schematic structural diagram of the side of a liquid crystal display panel on a lower substrate according to an embodiment of the present disclosure.
Figure 15:
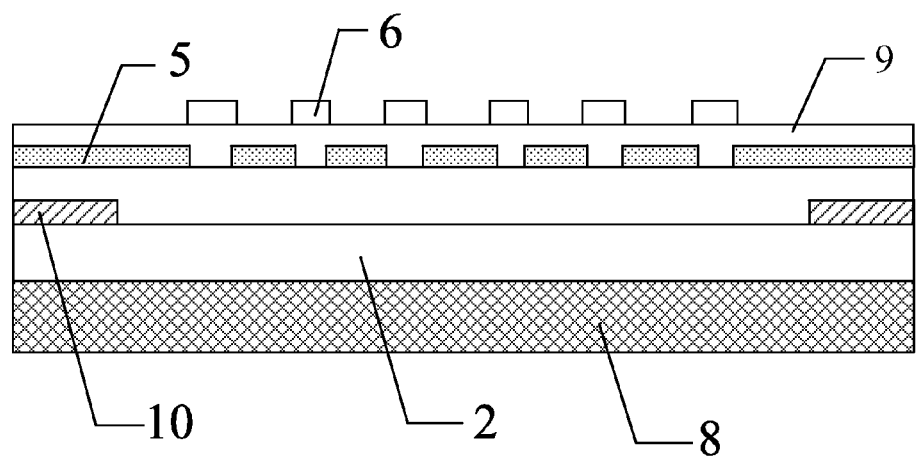
FIG. 15 is a further schematic structural diagram of the side of a liquid crystal display panel on a lower substrate according to an embodiment of the present disclosure.

Particularly in the liquid crystal display panel described above according to the embodiment of the disclosure, when the second common electrode and the pixel electrodes are arranged at different layers, as illustrated in FIG. 10 to FIG. 15, an insulation layer 9 between the second common electrode, i.e., the second electrode 5, and the pixel electrode, i.e., the third electrode 6, can be further included on the side of the lower substrate facing the upper substrate; and as illustrated in FIG. 13 to FIG. 15, where FIG. 14 is a sectional view of FIG. 13 along the CC direction, the second common electrode, i.e., the second electrode 5, is located below the insulation layer 9, and the pixel electrode, i.e., the third electrode 6, is located above the insulation layer 9; and at least one of the second common electrode and the pixel electrodes are structured in a grid. When the definition of the liquid crystal display panel is low, the area of the pixel electrodes is larger, and since the pixel electrodes are located above the second common electrode, the pixel electrode, i.e., the third electrode 6, needs to be arranged in a grid structure in order to ensure the horizontal electric field to be formed between the second common electrode and the pixel electrodes to control the liquid crystal molecules to be inverted; and as illustrated in FIG. 14, the second common electrode, i.e., the second electrode 5, can be structured planar, or as illustrated in FIG. 15, the second common electrode, i.e., the second electrode 5, can alternatively be structured in a grid, but the disclosure will not be limited in this regard. When the definition of the liquid crystal display panel is high, the number of pixels per unit area is larger than or equal to 350, the area of the pixel electrodes is small; and the pixel electrodes can alternatively be arranged in a planar structure, and the second common electrode can be structure planar, or the second common electrode can alternatively be arranged in a grid, but the disclosure will not be limited in this regard.

Figure 16:
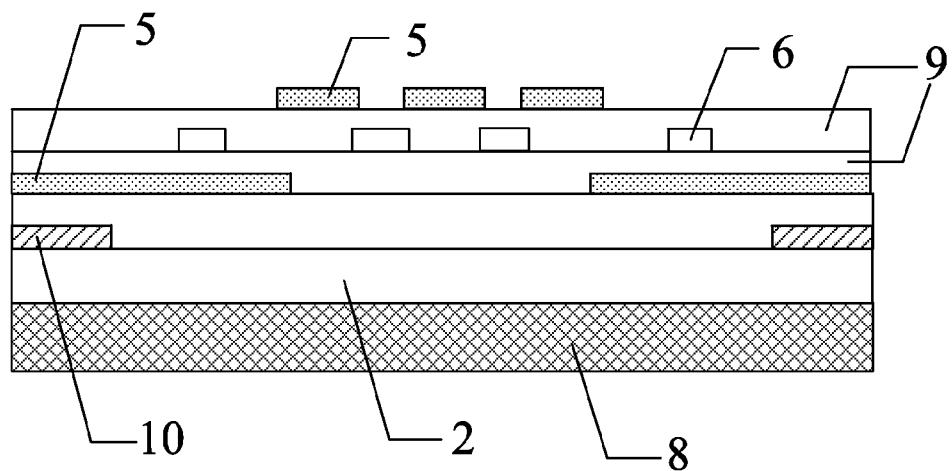
FIG. 16 is a further schematic structural diagram of the side of a liquid crystal display panel on a lower substrate according to an embodiment of the present disclosure.

Moreover, the structure of the second common electrode and the structure of the pixel electrodes will not be limited to the structure in a single layer above, but as illustrated in FIG. 16, the second common electrode, i.e., the second electrode 5, can be structured in a plurality of layers instead; or course, the pixel electrodes can alternatively be structured in a plurality of layers as long as the horizontal electric field formed between the second common electrode and the pixel electrodes can be ensured to control the liquid crystal molecules to be inverted.

Figure 17A:
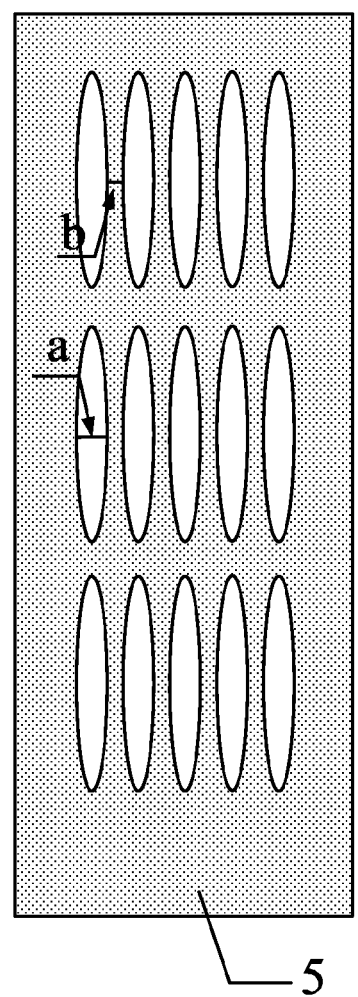
FIG. 17a to FIG. 17d are schematic diagrams of a grid structure in a second electrode of a liquid crystal display panel according to an embodiment of the present disclosure respectively.
Figure 17B:
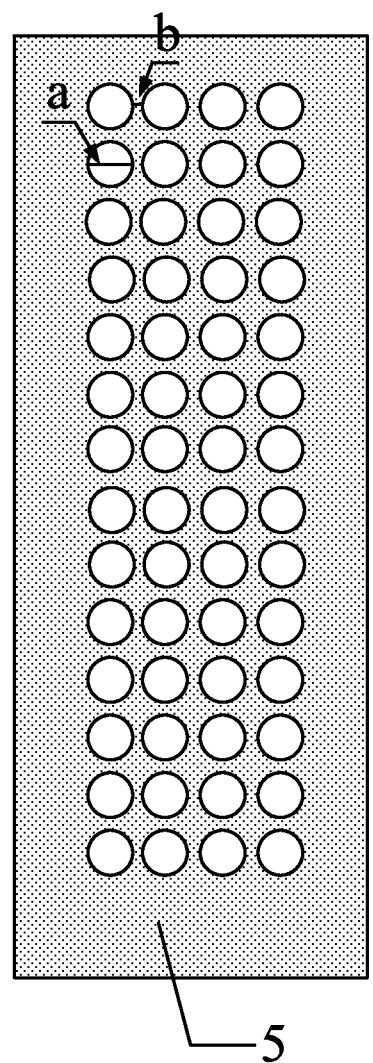
Figure 17C:
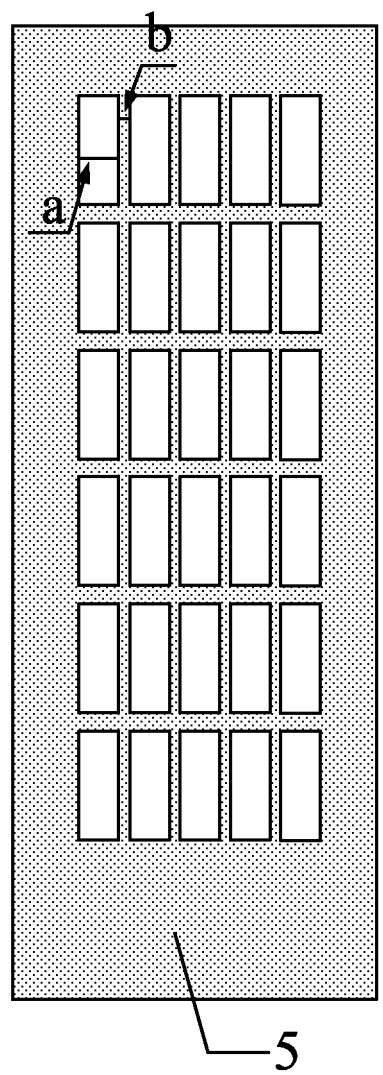
Figure 17D:
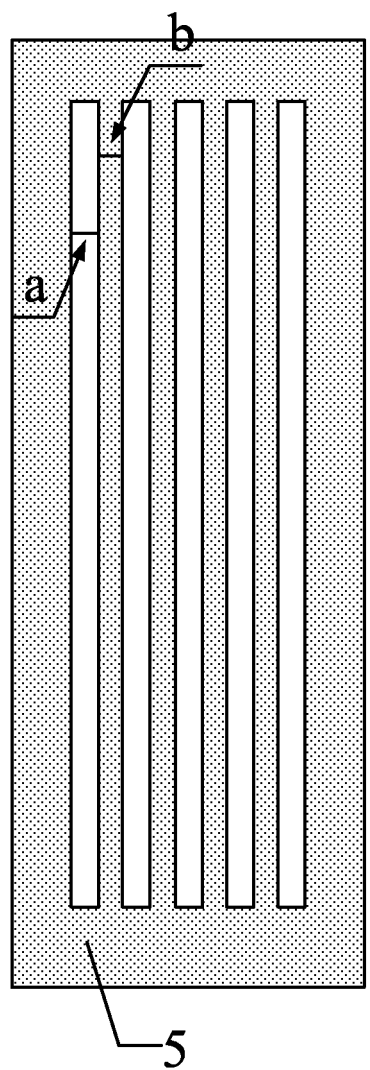

In a particular implementation, taking the second common electrode having a grid structure as an example, a hollow pattern in the grid structure can be elliptic (as illustrated in FIG. 17a), circular (as illustrated in FIG. 17b), rectangular (as illustrated in FIG. 17c and FIG. 17d), etc., but the disclosure will not be limited in this regard. Preferably the hollow pattern in the grid structure is arranged elliptic so that the problem of light leakage can be avoided or a high aperture ratio can be achieved. Moreover in the grid structure, as illustrated in FIG. 17a to FIG. 17d, typically the large width "a" of the hollow pattern is greater than or equal to 6 μm, and the small width "b" of the spacing between the hollow patterns is smaller than or equal to 2.5 μm.

Particularly the liquid crystal display panel described above according to the embodiment of the disclosure, as illustrated in FIG. 8 to FIG. 15 can further include signal transmission lines on the side of the lower substrate to the upper substrate, typically source/drain transmission lines 10, which are completely covered by the orthographic projection of the second common electrode, i.e., the second electrode 5, onto the lower substrate. Thus, when the liquid crystal molecules are positive liquid crystal molecules, the vertical electric field between the first common electrode and the second common electrode can shield light and control the positive liquid crystal molecules in the area of the second common electrode to be aligned in the direction perpendicular to the lower substrate 2, and at this time, light emitted from a backlight source (not illustrated) is polarized by the second polarizing sheet 8 into linearly polarized light in the same polarization direction as the direction of the light transmitting axis of the second polarizing sheet 8, where the linearly polarized light will not be subject to the effect of birefringence through the positive liquid crystal molecules in the area, but the linearly polarized light is perpendicular to the direction of the transmitting axis of the first polarizing sheet, and the linearly polarized light is absorbed by the first polarizing sheet but doesn't exit from the side of the first polarizing sheet, that is, no light is transmitted in the area of the second common electrode so that the source/drain transmission lines 10 in the area of the second common electrode can be shielded to thereby dispense with the arrangement of the light shielding layer so that the process of fabricating the liquid crystal display panel could be simplified but also the aperture ratio of the display panel could be improved effectively, which is particularly suitable for a liquid crystal display panel at high definition.

Particularly, the liquid crystal display panel described above according to the embodiment of the disclosure can further include a light shielding layer on the side of the upper substrate facing the lower substrate to shield source/drain transmission lines, which is particularly suitable for a liquid crystal display panel with liquid crystal molecules that are negative liquid crystal molecules. Since when the liquid crystal molecules are negative liquid crystal molecules, there is a vertical electric field between the first common electrode and the second common electrode so that the negative liquid crystal molecules in the area of the vertical electric field are inclined "lying down" in the direction of the electric field, and light emitted from a backlight source is polarized by the second polarizing sheet into linearly polarized light in the same polarization direction as the direction of the light transmitting axis of the second polarizing sheet, where the linearly polarized light is converted by the negative liquid crystal molecules in the area into circularly (elliptically) polarized light which can exit the side of the first polarizing sheet, that is, there is light leakage in the area of the vertical electric field, so when there are traveling metal lines, etc., arranged in the area of the vertical electric field, i.e., the area of the second common electrode, a light shielding layer needs to be arranged in the area of the vertical electric field, i.e., the area of the second common electrode to shielded the traveling metal lines, etc., and typically the light shielding layer is arranged on the side of the upper substrate to correspond to a pattern of the metal transmission lines for the effect of light shielding.

Particularly in the liquid crystal display panel described above according to the embodiment of the disclosure, the alignment layers may not be arranged on the side of the upper substrate facing the lower substrate and the side of the lower substrate facing the upper substrate but the arrangement state of the liquid crystal molecules can be controlled by changing the electric field between the upper substrate and the lower substrate to result in different display states of the liquid crystal display panel display; and of course, the first alignment layer could be arranged on the side of the upper substrate facing the lower substrate and/or the second orienting layer can be arranged on the side of the lower substrate facing the upper substrate to thereby control the initial state of the liquid crystal molecules to result in different display states of the liquid crystal display panel display, but the disclosure will not be limited in this regard.

Figure 18:
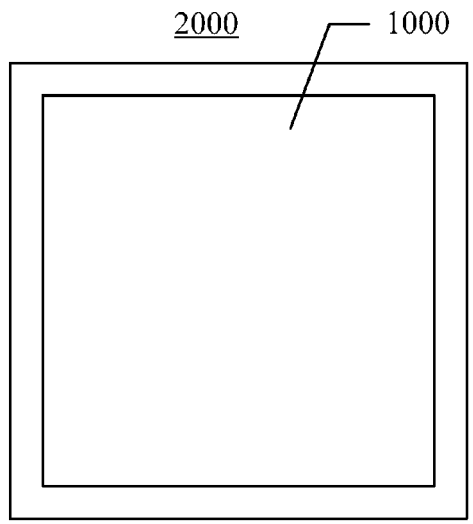
FIG. 18 is a schematic structural diagram of a display device according to an embodiment of the present disclosure.

Based upon the same inventive idea, as illustrated in FIG. 18, an embodiment of the disclosure further provides a display device 2000 including the liquid crystal display panel 1000 described above according to the embodiment of the disclosure. The display device 2000 can be a handset, a tablet computer, a TV set, a display, a notebook computer, a digital photo frame, a navigator and any other product or component with a display function. Reference can be made to the embodiments of the liquid crystal display panel above for an implementation of the display device, so a repeated description thereof will be omitted here.

Figure 19:
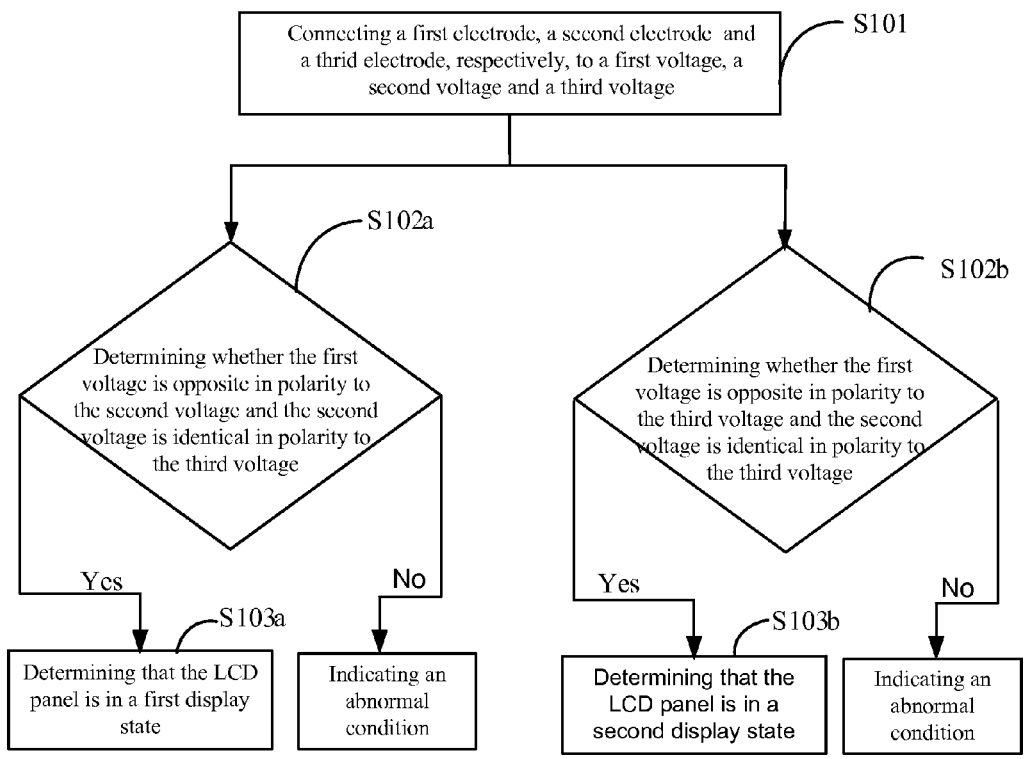
FIG. 19 is a flow chart of a method of driving a liquid crystal display panel according to an embodiment of the present disclosure.

Based upon the same inventive idea, an embodiment of the disclosure provides a method of driving a liquid crystal display panel. Referring to FIG. 19, the method includes the following operations:

S101: connect a first electrode, a second electrode and a third electrode respectively to a first voltage, a second voltage and a third voltage. Thereafter, perform S102a and S102b;

S102a: determine whether the first voltage is opposite in polarity to the second voltage and the second voltage is identical in polarity to the third voltage, and in the event that the first voltage is opposite in polarity to the second voltage and the second voltage is identical in polarity to the third voltage, perform S103a;

S103a: determine that the liquid crystal display panel is in a first display state;

S102b: determine whether the first voltage is identical in polarity to the third voltage and the second voltage is opposite in polarity to the third voltage, and in the event that the first voltage is identical in polarity to the third voltage and the second voltage is opposite in polarity to the third voltage, perform S103b;

S103b: determine that the liquid crystal display panel is in a second display state.

In the above-described driving method, an electric field between two substrates is changed by applying different voltages to the first electrode, the second electrode and the third electrode without arranging any alignment layer to control the alignment state of liquid crystal molecules so that a process of fabricating the liquid crystal display panel can be simplified and liquid crystal molecules with a low drive voltage and a high response speed can be selected, thereby reducing power consumption thereof and improving a response speed thereof.

In the above-described driving method, the first electrode can particularly be a first common electrode, the second electrode can particularly be a second common electrode, and the third electrode can particularly include a plurality of pixel electrodes arranged in a matrix. It is noted that, if other situations arise other than the situations in S102a and S102b, then the liquid crystal display panel is neither in the first display state nor in the second display state, thus indicating an abnormal condition. It is further noted that the determination can be performed by a general-purpose processing unit or an application specific integrated circuit (ASIC). In an embodiment, the determination is performed by the same integrated circuit that provides the first, second, and third voltages to the respective first, second, and third electrodes.

Figure 20:
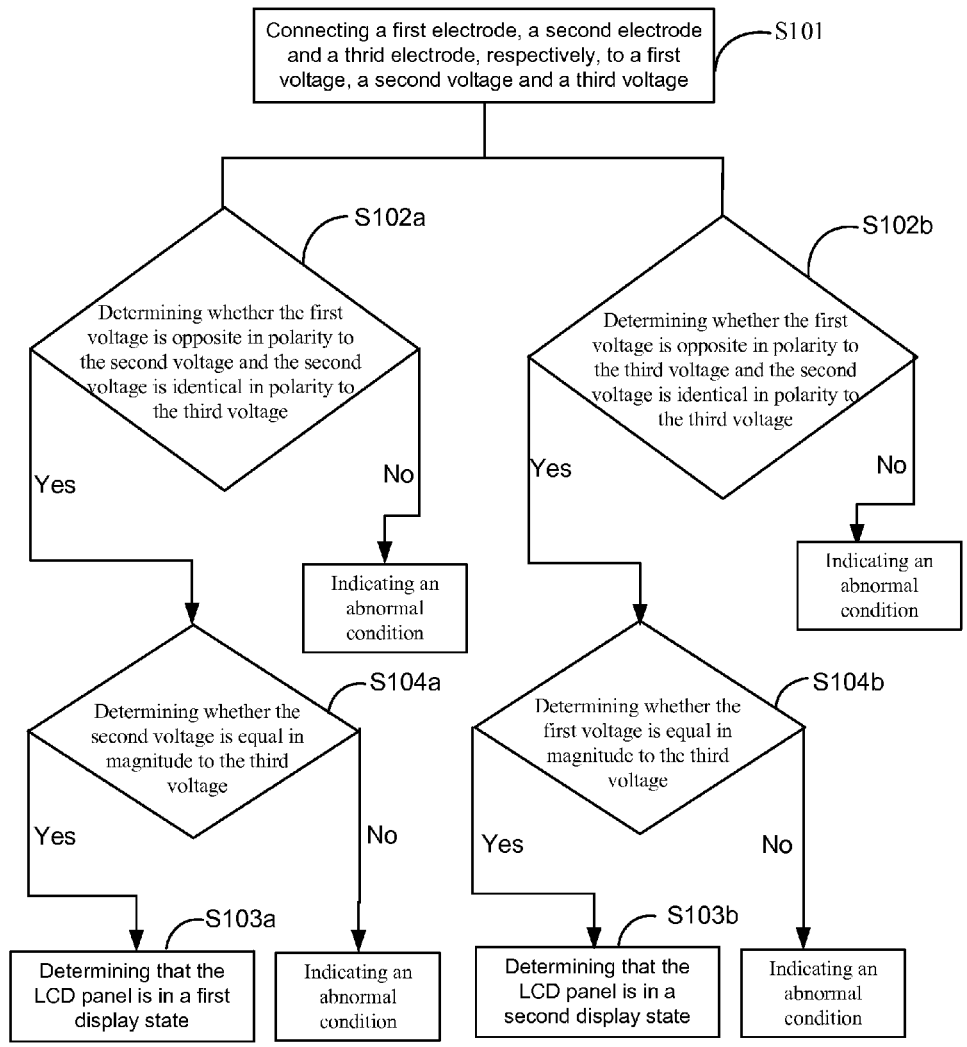
FIG. 20 is a flow chart of a method of driving a liquid crystal display panel according to an embodiment of the present disclosure.

After S102a, the method may further perform:

S104a: determine whether the second voltage is equal in magnitude to the third voltage, and in the event that the second voltage is equal in magnitude to the third voltage, perform S103a (FIG. 20).

It shall be noted that the first voltage is opposite in polarity to the second voltage, and the absolute value of the first voltage may be equal in magnitude to the absolute value of the second voltage, or the absolute value of the first voltage may not be equal in magnitude to the absolute value of the second voltage, but the disclosure will not be limited in this regard; and the second voltage is identical in polarity to the third voltage, and the second voltage may be equal in magnitude to the third voltage, or the second voltage may not be equal in magnitude to the third voltage, but the disclosure will not be limited in this regard.

After S102b, as illustrated in FIG. 20, the method may further perform:

S104b: determine whether the first voltage is equal in magnitude to the third voltage, and in the event that the first voltage is equal in magnitude to the third voltage, perform S103b.

It shall be noted that the first voltage is identical in polarity to the third voltage, and the first voltage may be equal in magnitude to the third voltage, or the first voltage may not be equal in magnitude to the third voltage, but the disclosure will not be limited in this regard; and the second voltage is opposite in polarity to the third voltage, and the absolute value of the second voltage may be equal in magnitude to the absolute value of the third voltage, or the absolute value of the second voltage may not be equal in magnitude to the absolute value of the third voltage, but the disclosure will not be limited in this regard. It is noted that, if other situations arise other than the situations in S104a and S104b, then the liquid crystal display panel is neither in the first display state nor in the second display state, thus indicating an abnormal condition.

Figure 21:
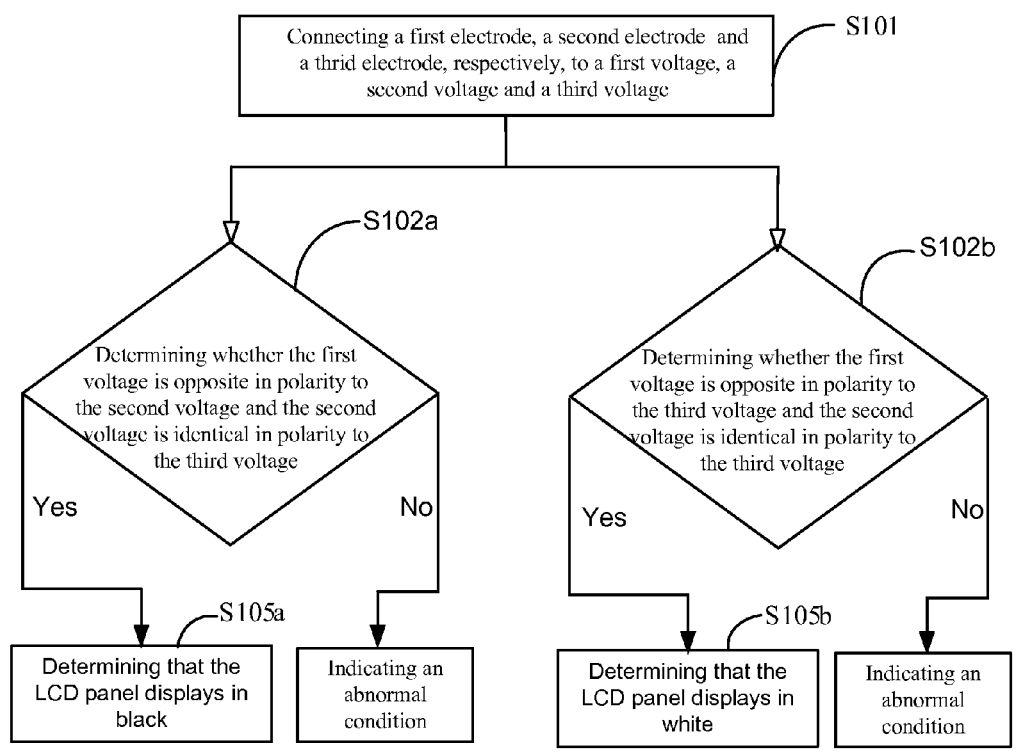
FIG. 21 is a flow chart of a method of driving a liquid crystal display panel where liquid crystal molecules are positive liquid crystal molecules according to an embodiment of the present disclosure.

In the above-described driving method, the liquid crystal display panel further includes a first polarizing sheet on the side of an upper substrate away from a lower substrate and a second polarizing sheet on the side of the lower substrate away from the upper substrate, where the direction of a light transmitting axis of the first polarizing sheet is perpendicular to the direction of a light transmitting axis of the second polarizing sheet, and the liquid crystal molecules are positive liquid crystal molecules; and after S102a, the driving method described above may further determine whether the first voltage is opposite in polarity to the second voltage and the second voltage is identical in polarity to the third voltage, in the event that the first voltage is opposite in polarity to the second voltage and the second voltage is identical in polarity to the third voltage, then perform S103a is performed whether it is determined that the liquid crystal display panel is in the first display state, as illustrated in FIG. 21, which can be determined particularly as follows:

S105a: determine that the liquid crystal display panel displays in black.

After S102b where it is determined whether the first voltage is identical in polarity to the third voltage and the second voltage is opposite in polarity to the third voltage, in the event that the first voltage is identical in polarity to the third voltage and the second voltage is opposite in polarity to the third voltage, then perform S103b to determine that the liquid crystal display panel is in the second display state, as illustrated in FIG. 21, which can be determined as follows:

S105b: determine that the liquid crystal display panel displays in white.

Figure 22:
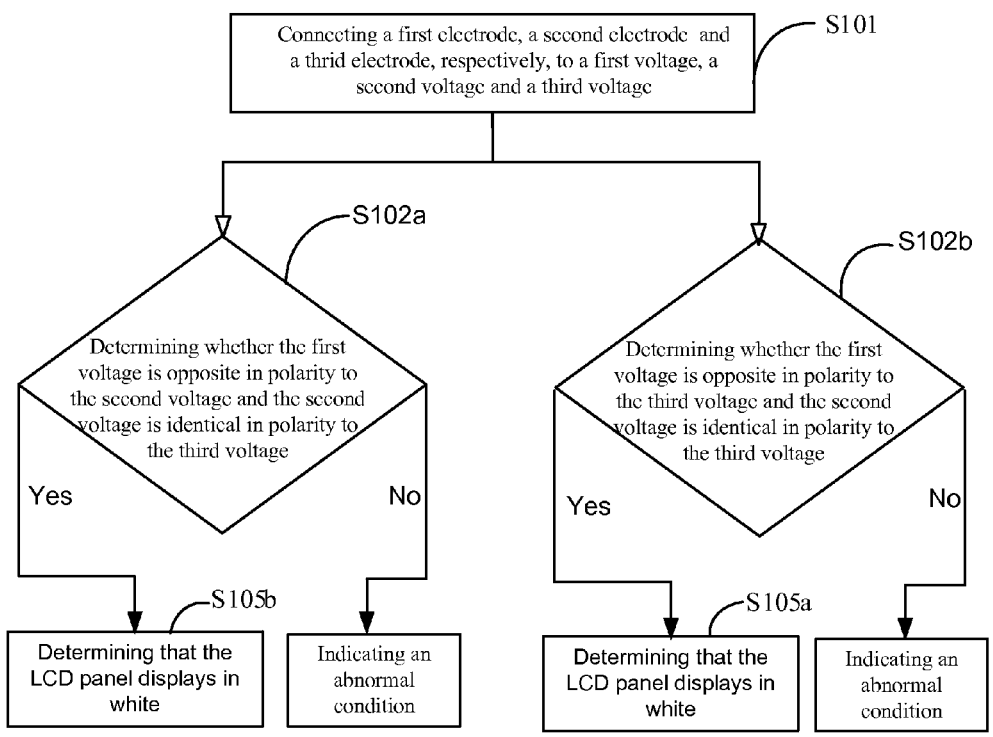
FIG. 22 is a flow chart of a method of driving a liquid crystal display panel where liquid crystal molecules are negative liquid crystal molecules according to an embodiment of the present disclosure.

In the driving method described above according to the embodiment of the disclosure, the liquid crystal display panel further includes a first polarizing sheet on the side of an upper substrate away from a lower substrate and a second polarizing sheet on the side of the lower substrate away from the upper substrate, where the direction of a light transmitting axis of the first polarizing sheet is perpendicular to the direction of a light transmitting axis of the second polarizing sheet, and liquid crystal molecules are negative liquid crystal molecules; and after S102a is performed where it is determined whether the first voltage is opposite in polarity to the second voltage and the second voltage is identical in polarity to the third voltage, if so, then S103a is performed whether it is determined that the liquid crystal display panel is in a first display state, as illustrated in FIG. 22, which can be determined particularly as follows:

S105b: determine that the liquid crystal display panel displays in white;

After S102b is performed where it is determined whether the first voltage is identical in polarity to the third voltage and the second voltage is opposite in polarity to the third voltage, if so, then S103b is performed whether it is determined that the liquid crystal display panel is in a second display state, as illustrated in FIG. 22, which can be determined as follows:

S105a: determine that the liquid crystal display panel displays in black.

A particular implementation of the method above of driving a liquid crystal display panel according to the embodiment of the disclosure is similar to the embodiment of the liquid crystal display panel above according to the disclosure, so a repeated description thereof will be omitted here.

With a liquid crystal display panel, a method of driving the same and a display device according to the embodiments of the disclosure, the liquid crystal display panel includes an upper substrate and a lower substrate, both of which are arranged in opposition, a liquid crystal layer between the two substrates, a first electrode on the side of the upper substrate facing the lower substrate, and a second electrode and a third electrode, on the side of the lower substrate facing the upper substrate, electrically insulated from each other, where the first electrode, the second electrode and the third electrode are connected respectively to a first voltage, a second voltage and a third voltage so that when the first voltage is opposite in polarity to the second voltage and the second voltage is identical in polarity to the third voltage, the liquid crystal display panel is in a first display state; and when the first voltage is identical in polarity to the third voltage and the second voltage is opposite in polarity to the third voltage, the liquid crystal display panel is in a second display state; and the arrangement state of liquid crystal molecules is controlled by changing electric fields between the two substrates without arranging any alignment layer so that a process of fabricating the liquid crystal display panel can be simplified and liquid crystal molecules with a low drive voltage and a high response speed can be selected to thereby lower power consumption thereof and improve a response speed thereof.

Evidently those skilled in the art can make various modifications and variations to the disclosure without departing from the scope of the disclosure. Thus the disclosure is also intended to encompass these modifications and variations thereto so long as the modifications and variations come into the scope of the claims appended to the disclosure and their equivalents.

What is claimed is:

1. A liquid crystal display panel comprising:
    an upper substrate and a lower substrate arranged opposite to each other;
    a liquid crystal layer disposed between the upper substrate and the lower substrate;
    a first electrode disposed on a side of the upper substrate facing the lower substrate; and
    a second electrode and a third electrode disposed on a side of the lower substrate facing the upper substrate and electrically insulated from each other,
    wherein the first electrode, the second electrode, and the third electrode are connected respectively to a first voltage, a second voltage, and a third voltage,
    wherein, when the first voltage is opposite in polarity to the second voltage and the second voltage is identical in polarity to the third voltage, the liquid crystal display panel is in a first display state; and
    wherein, when the first voltage is identical in polarity to the third voltage and the second voltage is opposite in polarity to the third voltage, the liquid crystal display panel is in a second display state.

2. The liquid crystal display panel of claim 1, wherein, when the liquid crystal display panel is in the first display state, the second voltage is equal in magnitude to the third voltage.

3. The liquid crystal display panel of claim 1, wherein when the liquid crystal display panel is in the second display state, the first voltage is equal in magnitude to the third voltage.

4. The liquid crystal display panel of claim 1 further comprising a first polarizing sheet provided on a side of the upper substrate facing away from the lower substrate and a second polarizing sheet provided on a side of the lower substrate facing away from the upper substrate, wherein:
    a direction of a light transmitting axis of the first polarizing sheet is perpendicular to a direction of a light transmitting axis of the second polarizing sheet, and the liquid crystal layer comprises positive liquid crystal molecules,
    the liquid crystal display panel displays in white in the first display state, and displays in black in the second display state.

5. The liquid crystal display panel of claim 1 further comprising a first polarizing sheet provided on a side of the upper substrate facing away from the lower substrate and a second polarizing sheet provided on a side of the lower substrate away from the upper substrate, wherein:
    a direction of a light transmitting axis of the first polarizing sheet is perpendicular to a direction of a light transmitting axis of the second polarizing sheet, and the liquid crystal layer comprises negative liquid crystal molecules,
    the liquid crystal display panel displays in white in the first display state, and displays in black in the second display state.

6. The liquid crystal display panel of claim 1, wherein the first electrode comprises a first common electrode, the second electrode comprises a second common electrode, and the third electrode comprises a plurality of pixel electrodes.

7. The liquid crystal display panel of claim 6, wherein the second common electrode is disposed in a same layer as the pixel electrodes.

8. The liquid crystal display panel of claim 6, wherein the second common electrode is disposed in a different layer from the pixel electrodes.

9. The liquid crystal display panel of claim 8, further comprising an insulation layer between the second common electrode and the pixel electrodes, wherein:
    the second common electrode is located above the insulation layer, and the pixel electrodes are located below the insulation layer; and
    the second common electrode comprises a grid structure.

10. The liquid crystal display panel of claim 8, further comprising an insulation layer disposed between the second common electrode and the pixel electrodes, wherein:
    the second common electrode is located below the insulation layer, and the pixel electrodes are located above the insulation layer; and
    at least one of the second common electrode or the pixel electrodes comprise a grid structure.

11. The liquid crystal display panel of claim 6, further comprising a signal transmission line on a side of the lower substrate facing the upper substrate, the signal transmission line being completely covered by an orthographic projection of the second common electrode onto the lower substrate.

12. The liquid crystal display panel of claim 6, further comprising a light shielding layer provided on a side of the upper substrate facing the lower substrate.

13. The liquid crystal display panel of claim 6, further comprising a first alignment layer provided on the side of the upper substrate facing the lower substrate, and a second alignment layer provided on a side of the lower substrate facing the upper substrate.

14. A display device comprising a liquid crystal display panel, the liquid crystal display panel comprising: an upper substrate and a lower substrate arranged opposite to each other, a liquid crystal layer disposed between the upper substrate and the lower substrate, a first electrode disposed on a side of the upper substrate facing the lower substrate, and a second electrode and a third electrode disposed on a side of the lower substrate facing the upper substrate and electrically insulated from each other,
wherein the first electrode, the second electrode, and the third electrode are connected respectively to a first voltage, a second voltage, and a third voltage,
wherein, when the first voltage is opposite in polarity to the second voltage and the second voltage is identical in polarity to the third voltage, the liquid crystal display panel is in a first display state; and
wherein, when the first voltage is identical in polarity to the third voltage and the second voltage is opposite in polarity to the third voltage, the liquid crystal display panel is in a second display state.

15. A method of driving a liquid crystal display panel comprising: an upper substrate and a lower substrate arranged opposite to each other, a liquid crystal layer disposed between the upper substrate and the lower substrate, a first electrode disposed on a side of the upper substrate facing the lower substrate, and a second electrode and a third electrode disposed on a side of the lower substrate facing the upper substrate and electrically insulated from each other, the method comprising:
connecting the first electrode, the second electrode and the third electrode respectively to the first voltage, the second voltage and the third voltage;
determining whether the first voltage is opposite in polarity to the second voltage and the second voltage is identical in polarity to the third voltage; in the event that the first voltage is opposite in polarity to the second voltage and the second voltage is identical in polarity to the third voltage:
determining that the liquid crystal display panel is in the first display state; and
determining whether the first voltage is identical in polarity to the third voltage and the second voltage is opposite in polarity to the third voltage; in the event that the first voltage is identical in polarity to the third voltage and the second voltage is opposite in polarity to the third voltage:
determining that the liquid crystal display panel is in the second display state.

16. The drive method of claim 15, wherein the first electrode comprises a first common electrode, the second electrode comprises a second common electrode, and the third electrode comprises a plurality of pixel electrodes.

17. The drive method of claim 16, wherein determining that the liquid crystal display panel is in the first display state comprises:
determining whether the second voltage is equal in magnitude to the third voltage.

18. The drive method of claim 16, wherein determining that the liquid crystal display panel is in the second display state comprises:
determining whether the first voltage is equal in magnitude to the third voltage.

19. The drive method of claim 16, wherein the liquid crystal display panel further comprises a first polarizing sheet provided on a side of the upper substrate facing away from the lower substrate and a second polarizing sheet provided on a side of the lower substrate facing away from the upper substrate, wherein a direction of a light transmitting axis of the first polarizing sheet is perpendicular to a direction of a light transmitting axis of the second polarizing sheet, and the liquid crystal comprises positive liquid crystal molecules;
determining that the liquid crystal display panel is in the first display state comprises:
determining that the liquid crystal display panel displays in black; and
determining that the liquid crystal display panel is in the second display state comprises:
determining that the liquid crystal display panel displays in white.

20. The drive method of claim 16, wherein the liquid crystal display panel further comprises a first polarizing sheet provided on a side of the upper substrate facing away from the lower substrate and a second polarizing sheet provided on a side of the lower substrate facing away from the upper substrate, wherein a direction of a light transmitting axis of the first polarizing sheet is perpendicular to a direction of a light transmitting axis of the second polarizing sheet, and the liquid crystal comprises negative liquid crystal molecules;
determining that the liquid crystal display panel is in the first display state comprises:
determining that the liquid crystal display panel displays in white; and
determining that the liquid crystal display panel is in the second display state comprises:
determining that the liquid crystal display panel displays in black.

* * * * *